United States Patent
Burke et al.

(10) Patent No.: US 10,127,632 B1
(45) Date of Patent: Nov. 13, 2018

(54) DISPLAY AND UPDATE OF PANORAMIC IMAGE MONTAGES

(71) Applicant: Google Inc., Mountain View, CA (US)

(72) Inventors: Ryan Burke, Brooklyn, NY (US); Troy Lumpkin, Brooklyn, NY (US); Daniel Motzenbecker, New York, NY (US); Brian K. Kehrer, Brooklyn, NY (US); Glenn Cochon, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 67 days.

(21) Appl. No.: 15/256,703

(22) Filed: Sep. 5, 2016

(51) Int. Cl.
  *G09G 5/00* (2006.01)
  *G06T 3/40* (2006.01)
  *G06T 11/60* (2006.01)

(52) U.S. Cl.
  CPC ............ *G06T 3/4038* (2013.01); *G06T 11/60* (2013.01); *G06T 2200/24* (2013.01); *G06T 2200/32* (2013.01)

(58) Field of Classification Search
  CPC .... G06T 3/4038; G06T 11/60; G06T 2200/32
  See application file for complete search history.

(56) References Cited

U.S. PATENT DOCUMENTS

| | | | |
|---|---|---|---|
| 2007/0031062 A1* | 2/2007 | Pal .................... | G06F 17/30843 382/284 |
| 2015/0009359 A1* | 1/2015 | Zaheer ................. | H04N 1/6077 348/223.1 |
| 2015/0207988 A1* | 7/2015 | Tracey ............... | H04N 5/23238 348/36 |
| 2015/0254807 A1* | 9/2015 | Citrin .................... | G06T 3/4038 382/284 |

OTHER PUBLICATIONS

Bell, Karissa, "Splash's virtual reality app aims to make 360-degree videos as easy as Snapchat", https://mashable.com/2016/03/14/splash-vr-app/#vzuAlteCPuqW, Mar. 14, 2016, 3 pages.
Cade, DL, "Photonomie Lets you Chat in Real Time Using Immersive 360 degree Photos", PetaPixel, https://petapixel.com/2016/04/05/immersive-photo-app-photonomie-wants-say-goodbye-rectangular-photo/, Apr. 5, 2016, 3 pages.
Thottam, Isabel, "Splash: The New Virtual Reality App That Lets You Create and Experience 360 Degree Videos on Your Phone", Paste Magazine, https://www.pastemagazine.com/articles/2016/06/splash-the-new-virtual-reality-app-that-lets-you-c.html, Jun. 16, 2016, 2 pages.

* cited by examiner

*Primary Examiner* — Charles Tseng
(74) *Attorney, Agent, or Firm* — IP Spring

(57) ABSTRACT

Implementations relate to display and update of panoramic image montages. In some implementations, a computer-implemented method includes causing one or more view portions of a panoramic image montage to be displayed in a display view of a display device. First user input is received at a first time while at least one of the one or more view portions of the panoramic image montage is displayed. In response to the first user input, an image feed is caused to be displayed, the image feed including a plurality of image frames captured by a camera. Second user input is received at a second time later than the first time while a particular view portion of the panoramic image montage is displayed in the display view. In response to the second user input, the particular view portion is updated based on the image feed.

20 Claims, 9 Drawing Sheets

DISPLAY AND UPDATE OF PANORAMIC IMAGE MONTAGES

BACKGROUND

The popularity and convenience of digital camera devices as well as the widespread of use of Internet communications have caused user-produced visual content such as digital photographs and videos to become ubiquitous. For example, various types of images can be captured and displayed, including standard images and panoramic images providing larger views of image content, such as spherical images. For example, a panoramic image can depict an environment surrounding a camera, where the panoramic image can be mapped onto a display such that various different portions of the panoramic image can be displayed on a display screen. For example, some panoramic images can be viewed in 360 degrees.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of the present application relate to update and display of panoramic image montages. In some implementations, a computer-implemented method includes causing one or more view portions of a panoramic image montage to be displayed in a display view of a display device. First user input is received at a first time while at least one of the one or more view portions of the panoramic image montage is displayed. In response to the first user input, a image feed is caused to be displayed, where the image feed includes a plurality of image frames captured by a camera. Second user input is received at a second time later than the first time, where the second user input is received while a particular view portion of the one or more view portions of the panoramic image montage is displayed in the display view. In response to the second user input, the particular view portion of the panoramic image montage is updated based on the image feed.

Various implementations and examples of the method are described. For example, the image feed can be a live feed, and a particular image frame of the plurality of image frames can be captured at the second time by the camera with a first orientation, where a view orientation associated with the particular view portion corresponds to the first orientation. The image feed can be displayed in the display view over the particular view portion of the panoramic image montage. The updating can be based on a particular image frame of the image feed that corresponds to the second time. For example, the updating can include overlaying the particular image frame on an update portion of the panoramic image montage, where the update portion is at least partially displayed in the particular view portion of the panoramic image montage. In some examples, the display device can be a touchscreen device, and receiving the first user input can include detecting, by the touchscreen device, a touch input by a user, and receiving the second user input can include detecting, by the touchscreen device, that the touch input has ceased. The updating of the particular view portion of the panoramic image montage can include replacing an update portion of the image montage with a subset of the plurality of image frames, where each image frame in the subset is captured by the camera during the time interval between the first time and the second time.

The method can further include determining a time difference between the first time and the second time, where the updating is further based on the time difference. For example, the updating can include, prior to the overlaying, determining a transparency level of the particular image frame based on the time difference, where the overlaying is based on the transparency level. In some additional examples, the updating can include selecting a size of the update portion of the panoramic image montage based on the time difference. In some examples, the shape of the update portion can be an oval, rectangular, or rectangular with rounded corners.

The method can further include selecting one or more component image portions, each selected component image portion associated with a respective orientation, and constructing the one or more view portions of the panoramic image montage from the one or more component image portions based on the respective orientation. For example, the updating can include storing the particular image frame as an additional component image portion, where the additional component image portion is associated with the view orientation, and the method can further include storing a time difference between the first time and the second time as a parameter associated with the additional component image portion. The parameter can be used to determine at least one display characteristic of the additional component image portion. In some implementations, the method can further include retrieving one or more component image portions, each component image portion associated with a respective orientation, where at least one of the component image portions includes a plurality of component image frames. The method can include constructing the panoramic image montage from the component image portions based on the respective orientation. Causing the panoramic image montage to be displayed can include rendering the plurality of component image frames in sequence.

In further examples, causing the one or more view portions of the panoramic image montage to be displayed in the display view can include causing a spherical display of the one or more view portions of the panoramic image montage. The particular view portion of the panoramic image montage can include image content data previously added to the panoramic image montage, and the method can further include determining, based on a permission setting, that replacement of the image content data in the panoramic image montage is permitted, where the updating the particular view portion is performed in response to determining that the replacement is permitted. The method can further include receiving, over a network from a second device, a second image frame associated with a second orientation, and updating an update portion of the panoramic image montage based on the second image frame, wherein the update portion corresponds to the second orientation.

In some implementations, a device includes a memory, a camera, a display, and at least one processor configured to perform operations including causing one or more view portions of a panoramic image montage to be displayed in a display view of the display, where the one or more view portions are based on a device orientation of the device sensed by the orientation sensor. The operations include receiving first user input at a first time while at least one of the one or more view portions of the panoramic image montage is displayed and, in response to the first user input, causing a live feed to be displayed in the display view, where the live feed includes a plurality of image frames captured by the camera with a camera orientation based on the device orientation. The operations include receiving second user input at a second time later than the first time, where the second user input is received while a particular view portion of the one or more view portions of the panoramic image montage is displayed in the display view. In response to the second user input, one or more image frames are added from the live feed to at least one update portion of the panoramic image montage, where at least part of the update portion is in the particular view portion of the panoramic image montage.

Various implementations and examples of the device are described. For example, the processor can be further configured to perform operations including causing a plurality of particular view portions to be displayed in the display view after receiving the first user input and before receiving the second user input, where the plurality of particular view portions are displayed based on changes in the device orientation. The operations can include adding multiple image frames from the live feed to a plurality of update portions of the panoramic image montage, where the update portions are in the plurality of particular view portions.

In some implementations, a non-transitory computer readable medium can have stored thereon software instructions that, when executed by a processor, cause the processor to perform operations. The operations include receiving first user input at a device at a first time, and, in response to the first user input, causing an image feed to be displayed by a display of the device, where the image feed includes a plurality of image frames. The operations include receiving second user input at the device at a second time later than the first time, where the second user input is received while the device is oriented at a particular orientation. In response to the second user input, one or more image frames of the plurality of image frames are added to a particular portion of a panoramic image area, where the particular portion corresponds to the particular orientation of the device. After adding the one or more image frames, the one or more image frames are displayed in the display of the device in response to the device being oriented at the particular orientation.

DETAILED DESCRIPTION

Figure 1:
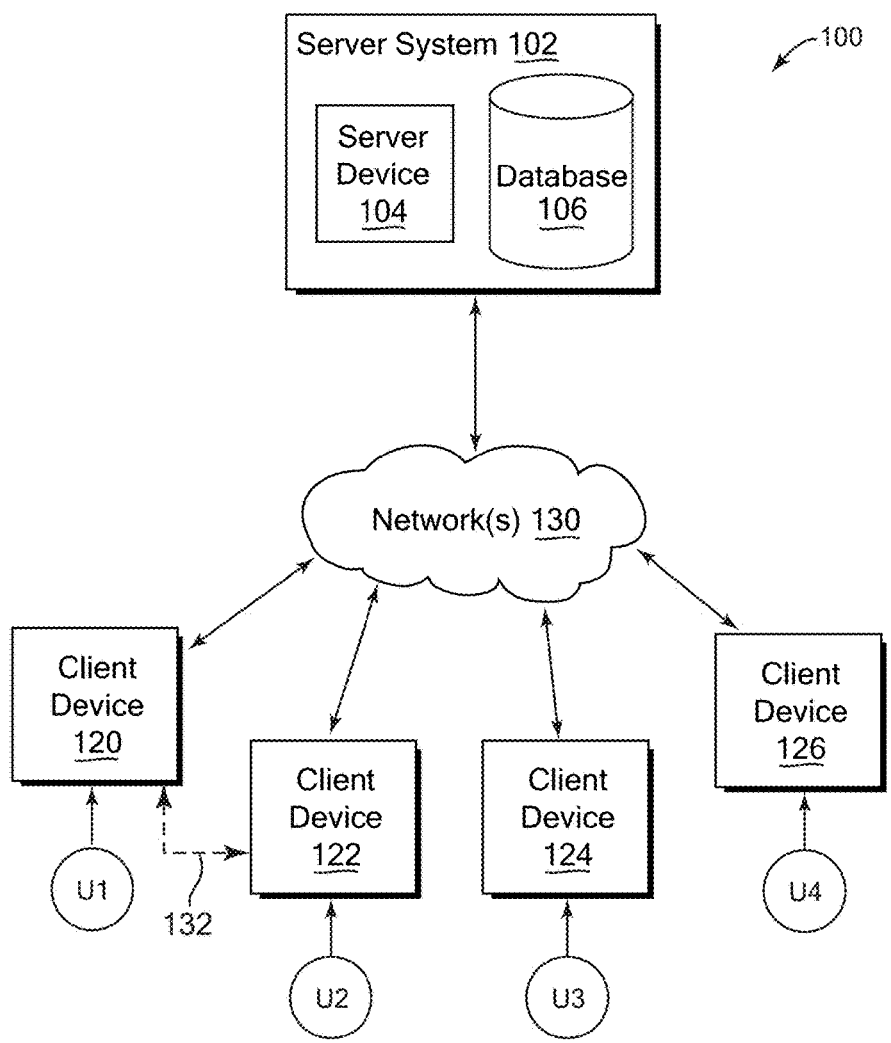
FIG. 1 is a block diagram of example systems and a network environment which may be used for one or more implementations described herein.

One or more implementations described herein relate to panoramic image montages. In some implementations, a view on a display of a device displays a portion of a panoramic image montage. The image montage can include multiple different image portions such as still images, video clips, animated images, etc. at various locations in the viewable area of a panorama. For example, the panoramic image montage can be a spherical image montage providing a 360-degree view of the component image portions of the montage, or other type of panoramic image montage. Changing the orientation of the view, such as by changing the orientation of the device in space, causes different portions of the image montage which correspond to the view orientation to be displayed in the view. First user input can be received, e.g., a touch on a touchscreen or other type of input, which causes an image feed to be displayed in the view, e.g., over part of the displayed portion of the image montage. For example, the image feed can be a live feed displaying image frames currently captured by a camera. In different examples, the image frames captured by the camera may be two-dimensional or three-dimensional. For example, the live feed may be captured by a camera of the device that has an orientation to which the view orientation corresponds. A second user input is then received, e.g., the release of the touch on the touchscreen or other type of input. The second input causes the viewed portion of the image montage to be updated based on the live feed. For example, one or more image frames from the live feed are overlaid on update portions of the image montage.

Various additional features are described. For example, an image frame of the feed that was displayed at the time that the second user input was received can be added to the panoramic image montage. In another example, multiple image frames of the feed that were displayed in a time interval between the first and second user inputs can be added to the image montage. A time difference between the first and second user inputs can be used to control one or more parameters for the update to the image montage. For example, the time difference can be used to determine a transparency level of the image frame(s) that are added to the image montage. The transparency level may allow existing image content to be partially visible, e.g., underneath the image frame(s) that are added to the image montage. In another example, the time difference can be used to determine a size of a portion of the image montage that is updated based on the image frame(s). For example, based on the time difference, the added image frames can be larger or smaller in size.

In various implementations, the panoramic image montage can be a single panoramic image, where the added image frames replace image content pixels of the image. In some implementations, the panoramic image montage can be displayed as a construction of retrieved individual component image portions that are associated with camera orientations and timestamps that indicate their orientation and time of capture. Additional features include allowing the updating of the panoramic image montage to be permitted based on user input or preferences, enabling multiple users to update the panoramic image montage, e.g., via a communication network and based on image feeds from their respective devices, and providing playback of recorded changes in image feed orientation and/or changes to the panoramic image montage.

One or more features described herein allow panoramic image montages to be created, displayed, and updated in straightforward and intuitive ways. Image content obtained from a live camera feed can be added to any portion of the panoramic image montage by orienting the view of the image montage to the portion to be updated. In some examples, updating of the image montage is provided via display of the image feed over portions of the image montage that are to be updated based on user input. First user input to display a camera feed and second user input to update the image montage allows a user to control updates to the image montage. For example, the user can orient the panoramic image montage to a selected portion to be updated. In another example, the user can orient the camera to capture particular image content in the image feed to add to the image montage at the selected portion. Further, the user can control various update parameters such as transparency, size, or other characteristics of the added image content. Various features allow the user to view and update a panoramic image montage in varied ways, including updating and displaying video clips and animated images in the image montage, displaying changes to the image montage over time, enabling multiple users and devices to update the image montage, and providing options to display any of multiple accessible panoramic image montages.

The panoramic image montages described herein can include images such as static images, animations, videos, cinemagraphs, etc. that are captured by one or more users at different locations at different times. Some described panoramic image montages, when displayed, can present a panoramic image area that is a virtual area or space to a viewing user and can include various image portions at respective orientations. When viewed with an immersive device, such as a virtual reality display device, some panoramic image montages can provide a vivid experience of an arbitrary three-dimensional space. Features described herein permit users to generate image montages that permit creative possibilities of combining various images (and audio) at orientations that are chosen by the users. For example, panoramic image montages described herein can be used as a form of expressing oneself, e.g., a user may construct and update a shared panoramic image montage that includes image content about topics of their interest, e.g., images of places they've visited, food they've eaten, pets, media items, etc. stitched together in a montage that can be viewed with a virtual reality device. Further, features described herein can permit users to view the panoramic montage at various times (e.g., a single montage may be played back through its history, such that changes to the montage are shown). Further, users can collaboratively generate or edit montages, interact with each other's montages, etc.

Described features can provide efficient creation, presentation, and update of panoramic image montages. Described features can allow a device to display various portions of a panoramic image montage. Further, described features allow a user to update those portions with new image content from a camera image feed in a highly customized manner using various input control features. The techniques allow reduction or avoidance of complex editing functions such as in a more traditional image editing interface. Consequently, a technical effect of one or more described implementations is that display, creation and modification of panoramic image montages is achieved with less computational time and resources expended to obtain results. For example, a technical effect of described features is a reduction in the consumption of system processing resources utilized to create and edit panoramic image montages than in a system that does not provide one or more of the described features.

A panoramic image montage, panoramic montage, or image montage, as referred to herein, refer to a collection of multiple image components (including still images, animations, videos, etc.) organized into a single presentation. The presentation can be stored as a single image including the collection of images as various portions of the single image (or a number of such images, each having multiple images of the image montage). Alternatively, the presentation can be stored as multiple individual component image portions, e.g., images or videos, that are displayed in a particular configuration so as to appear part of a single image montage. The image portions can be associated with respective orientations. For example, an image portion can be associated with an orientation that is based on an orientation of a camera that captured the image portion. The presentation can be displayed such that an image portion is displayed in a location corresponding to the orientation for that image portion. The image portions collected in the montage can be positioned within the montage to appear adjacent, e.g., stitched together, and/or have space between them. Image portions included in the image montage can depict image content that is continuous across multiple adjacent image portions, e.g., multiple images displayed adjacently to depict adjacent portions of a scene like a continuous landscape, or can depict image content that is different across multiple adjacent image portions, e.g., scenes captured at different times and/or different geographic locations and displayed adjacent to each other. In various implementations, a panoramic image montage can include image content from captured physical space, from created virtual or artificially-created scenes, or a combination of captured and created content. Image content data provided in the panoramic image montage can include still images, video data, animated images (e.g., cinemagraph), or other forms of image content. The image content data is digital image content that includes multiple pixels.

A panoramic image montage can provide an extended or wide view of image content such that a portion of the image montage corresponding to a current orientation is displayed in a displayed view. Different portions of the image montage can be displayed by moving (e.g., scrolling) the view within a defined panoramic image area (e.g., viewable display area) of the image montage. For example, the panoramic image area of the montage can be displayed as one or more simulated surfaces. For example, a panoramic image montage such as a spherical image montage can be presented in a three-dimensional spherical form by a particular display technique. In some examples, a displaying device can display a spherical image montage by displaying the image content of the spherical image montage as if projected on the inside surface of a sphere, where the viewer is positioned at or near the center of the sphere. In some examples, a panoramic image montage, when rendered, can provide a 360-degree spherical view around a viewing point in multiple directions, or can provide a portion of such a full 360 degree view (e.g., a 180 degree or hemispherical view, 270 degree view, etc.). In various implementations, a panoramic image montage can be presented in a partially spherical form, e.g., a half-sphere, or other partially spherical shapes. In some implementations, the panoramic image montage can be presented in other three-dimensional forms, such as ovoid, cylinder, cube, polyhedron, etc. In various implementations, the three-dimensional form can have a smooth surface, a contoured surface, etc.

In some examples, various portions of the panoramic image montage can be displayed in a display view over time, e.g., via automatic or predetermined scrolling (e.g., simulated panning and/or tilting) of the display view within the panoramic image area and with respect to the montage image content, or user-directed scrolling (e.g., panning and/or tilting) of the display view. In another example, image content of a panoramic image montage can be displayed scrolling or otherwise moving in a particular direction within a display view.

In some implementations, a panoramic image montage can be stored as a single planar, rectangular image, e.g., a group of pixels arranged in a rectangular form, or in another two-dimensional form. A display technique can convert the image data by using conversion techniques from the rectangular form to the panoramic display form. For example, a spherical image montage can be in stored in a rectangular, two-dimensional form, e.g., an equirectangular projection image. For example, in some implementations the rectangular image can have an aspect ratio of 2:1 horizontal length to vertical length as in a particular spherical image standard, where this aspect ratio is used to completely envelop a 360-degree spherical view. In some implementations, a portion of the panoramic image montage can be displayed by a viewing program interface, and different portions of the panoramic image montage can be displayed based on user input, program settings, etc. Some implementations can divide the single image into multiple images, e.g., for storage, for transmission, etc.

One or more systems and methods discussed herein do not require collection or usage of user personal information. In situations in which certain implementations discussed herein may collect or use personal information about users (e.g., user data, information about a user's social network, user's location and time at the location, user's biometric information, user's activities and demographic information), users are provided with one or more opportunities to control whether information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

FIG. 1 illustrates a block diagram of an example network environment 100, which may be used in some implementations described herein. In some implementations, network environment 100 includes one or more server systems, e.g., server system 102 in the example of FIG. 1. Server system 102 can communicate with a network 130, for example. Server system 102 can include a server device 104 and a database 106 or other storage device. Network environment 100 can also include one or more client devices, e.g., client devices 120, 122, 124, and 126, which may communicate with each other and/or with server system 102 via network 130. Network 130 can be any type of communication network, including one or more of the Internet, local area networks (LAN), wireless networks, switch or hub connections, etc. In some implementations, network 130 can include peer-to-peer communication 132 between devices, e.g., using peer-to-peer wireless protocols.

For ease of illustration, FIG. 1 shows one block for server system 102, server device 104, and database 106, and shows four blocks for client devices 120, 122, 124, and 126. Server blocks 102, 104, and 106 may represent multiple systems, server devices, and network databases, and the blocks can be provided in different configurations than shown. For example, server system 102 can represent multiple server systems that can communicate with other server systems via the network 130. In some examples, database 106 and/or other storage devices can be provided in server system block(s) that are separate from server device 104 and can communicate with server device 104 and other server systems via network 130. Also, there may be any number of client devices. Each client device can be any type of electronic device, e.g., a desktop computer, laptop computer, portable device (e.g., handheld), cell phone, smart phone, tablet computer, television, TV set top box or entertainment device, wearable devices (e.g., display glasses or goggles, head-mounted display (HMD), wristwatch, headset, armband, jewelry, etc.), virtual reality (VR) and/or augmented reality (AR) enabled devices, personal digital assistant (PDA), media player, game device, etc. A client device can be a mobile device that can be any handheld or wearable device. Some client devices may also have a local database similar to database 106 or other storage. In other implementations, network environment 100 may not have all of the components shown and/or may have other elements including other types of elements instead of, or in addition to, those described herein.

In various implementations, end-users U1, U2, U3, and U4 may communicate with server system 102 and/or each other using respective client devices 120, 122, 124, and 126. In some example implementations, users U1, U2, U3, and U4 may interact with each other via applications running on respective client devices and/or server system 102. In some implementations, the interaction may be performed via a network service, e.g., a social network service or other type of network service implemented on server system 102. For example, respective client devices 120, 122, 124, and 126 may communicate data to and from one or more server systems (e.g., server system 102). In some implementations, server system 102 may provide appropriate data to the client devices such that each client device can receive communicated content or shared content uploaded to the server system 102 and/or network service. In some examples, the users can interact via audio or video conferencing, audio, video, or text chat, or other communication modes or applications. In some examples, the network service can include any system allowing users to perform a variety of communications, form links and associations, upload and post shared content such as images, video, image montages, audio data, and other types of content, receive various forms of data, and/or perform socially-related functions. For example, the network service can allow a user to send messages to particular or multiple other users, form social links in the form of associations to other users within the network service, group other users in user lists, friends lists, or other user groups, post or send content including text, images (including panoramic image montages), video sequences, audio sequences or recordings, or other types of content for access by designated sets of users of the network service, participate in live video, audio, and/or text video-conferences or chat with other users of the service, etc. In some implementations, a "user" can include one or more programs or virtual entities, as well as persons that interface with the system or network.

A user interface can enable display of image content data including images, video data, and other content as well as enable communication data, privacy settings, notifications, and other data on a client device 120, 122, 124, and 126 (or alternatively on server system 102). Such an interface can be displayed using software on the client device, software on the server device, and/or a combination of client software and server software executing on server device 104, e.g., application software or client software in communication with server system 102. The user interface can be displayed by a display device of a client device or server device, such as one or more display screens, projectors, etc. In some implementations, application programs running on a server system can communicate with a client device to receive user input at the client device and to output data such as visual data, audio data, etc. at the client device.

In some implementations, server system 102 and/or one or more client devices 120-126 can provide a display application and/or an editing application. The display application may allow a device to display image content such as panoramic image montages as described herein. The application can allow a device to output various data, e.g., display video, images, text, and other data and output audio received by the client device running the application, where the video, images, and audio can be obtained from local and/or remote storage and/or over the network 130. The editing application can provide an associated user interface that is displayed on a display device associated with the server system or client device. The user interface may provide various display functions (e.g., display modes) for image content including panoramic image montages, as well as editing functions, some of which are described herein. In some implementations, the user interface can receive user input that allows display and editing features as described herein.

Various implementations of some features described herein can use any type of system and/or service. For example, photo collection services or other networked services (e.g., connected to the Internet) can be used. Any type of electronic device can make use of features described herein. Some implementations can provide features described herein on client or server devices disconnected from or intermittently connected to computer networks. In some examples, a client device including or connected to a display device can process and display data stored on storage devices local to the client device (e.g., not connected via a communication network) and can provide one or more features and results as described herein that are viewable to a user.

Figure 2:
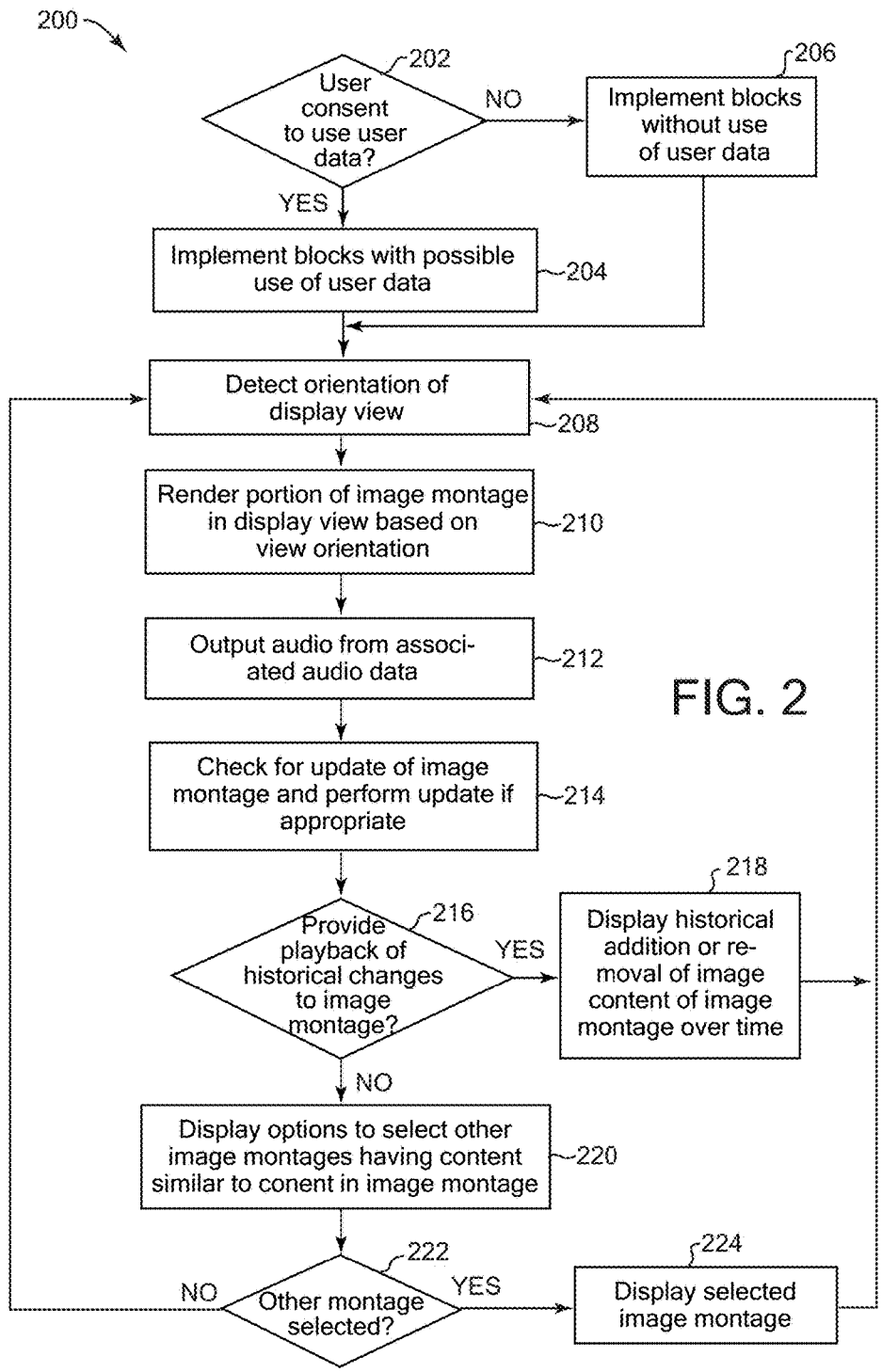
FIG. 2 is a flow diagram illustrating an example method to display and update a panoramic image montage, according to some implementations.

FIG. 2 is a flow diagram illustrating one example of a method 200 to display and update a panoramic image montage. In some implementations, method 200 can be implemented, for example, on a server system 102 as shown in FIG. 1. In some implementations, some or all of the method 200 can be implemented on a system such as one or more client devices 120, 122, 124, or 126 as shown in FIG. 1, and/or on both a server system and one or more client systems. In described examples, the implementing system includes one or more processors or processing circuitry, and one or more storage devices such as a database 106 or other accessible storage. In some implementations, different components of one or more servers and/or clients can perform different blocks or other parts of the method 200.

In block 202, it is checked whether user consent (e.g., user permission) has been obtained to use user data in the implementation of method 200 (and method 300, described below). For example, user data can include user preferences, user biometric information, user characteristics (identity, name, age, gender, profession, etc.), information about a user's social network and contacts, social and other types of actions and activities, content, ratings, and opinions created or submitted by a user, a user's current location, historical user data, etc. One or more blocks of the methods described herein may use such user data in some implementations. If user consent has been obtained from the relevant users for which user data may be used in the method 200, then in block 204, it is determined that the blocks of the methods herein can be implemented with possible use of user data as described for those blocks, and the method continues to block 208. If user consent has not been obtained, it is determined in block 206 that blocks are to be implemented without use of user data, and the method continues to block 208. In some implementations, if user consent has not been obtained, blocks are to be implemented without use of user data and with generic or publicly-usable data.

In block 208, an orientation of a display view is detected. For example, the display view can be a portion of an area of a display screen (or the entire area of the display screen) of a device. In some implementations, the display view is provided on a display screen of a mobile device, e.g., a mobile phone, tablet, goggles or glasses, etc. For example, the mobile device can be any of client devices 122, 124, 126, or 128. In some implementations, an orientation can be specified as a set of rotation angles (e.g., three rotation angles for three-dimensional orientation) with reference to a reference orientation or position.

In some mobile device examples, the orientation of the display view is the same as (or corresponds to) an orientation of the device in space, and/or corresponds to an orientation of a camera (as described below). For example, a user of the device can hold the device at a particular orientation in space, and the display screen showing the display view is at that orientation. In another example, a mobile device, such as a smartphone, may be placed inside an enclosure that may be worn by a user. For example, the mobile device may be placed in a wearable frame that can be worn by a user, such that a display screen of the mobile device is placed in front of a user's eyes. In these examples, one or more lenses may be included, e.g., within the enclosure, to provide an immersive viewing experience for a user. For example, if the device is a wearable device, e.g., a head-worn device such as goggles, glasses, head-mounted displays, etc., a user of the device can move or tilt their head in a particular direction and the orientation of the display screen showing the display view is determined based on the head position. In some examples, the user may utilize an input device, e.g., integrated with or separate from the mobile device, to specify the orientation. For example, gesture detection can be performed to determine an orientation based on one or more gestures performed by a user. In some examples, gestures may be detected by a wearable device that is separate from the mobile device, e.g., one or more rings worn on fingers, wrist-worn devices, etc.

In some implementations, the orientation of the display view is determined from the orientation of the mobile device, where the orientation of the mobile device is determined from sensor data obtained from one or more sensors of the device. For example, such sensors can include one or more gyroscopes providing gyroscope data for the device that is utilized to determine the orientation of the device. In some implementations, such sensors can include one or more accelerometers providing motion data for the device that is used to determine the orientation of the device. Some implementations can use both gyroscopes and accelerometers to determine orientation data for the device.

In additional examples, the display view can be an area of a display screen of a non-portable device, e.g., a display monitor in communication with a desktop computer or other non-portable device. In some non-portable device examples, the orientation of the display view is detected as a specified orientation, e.g., an orientation specified by received commands or data. For example, user input can specify particular rotational angles or angular positions in one or more rotational planes. In some examples, a user can drag a touch (e.g., with a finger) over a touchscreen input device or move a cursor over a display screen based on an input device such as mouse, trackpad, joystick, etc., and this input can indicate or specify a view orientation for the display view.

In block 210, a portion (e.g., "view portion") of an obtained panoramic montage image is rendered in the display view of the device based on the display view orientation detected in block 208. For example, the rendered view portion can be a portion of the panoramic image montage that corresponds to the view orientation of the display view, e.g., where the view orientation can correspond to the orientation of a mobile device displaying the display view. In some examples, the corresponding view portion of the panoramic image montage can be centered at the angular position of the display view. The panoramic image montage can be a spherical image montage, cylindrical image montage, or other form of panoramic image montage. The panoramic image montage can be obtained from accessible storage, e.g., local storage or remote networked storage, or received from a different device and/or user over a network connection, etc.

In some examples, the device is a mobile device (e.g., a handheld or wearable device) providing a view on a display screen (e.g., touchscreen, or screens of goggles) of the device that displays a view portion of the panoramic image montage, which is, e.g., a spherical image montage. The view orientation can correspond to the orientation of the device. The view portion of the spherical image montage that is displayed in the view can thus correspond to the current orientation of the mobile device. For example, if the mobile device is pointing up 90 degrees from a horizontal plane (e.g., a rear camera of a mobile phone is pointing toward the sky, and a display screen of the phone is pointed toward the ground), then a corresponding portion of the spherical image montage at that "up" orientation is displayed in the view as the view portion. As the device is moved to different orientations, different portions of the displayed spherical image montage are displayed which correspond to the new orientations of the device. The size and extent of the view portion of the image montage that is displayed in the view can depend on the virtual distance that the sphere surface is placed from the viewpoint within the spherical panoramic space, e.g., the radius of the sphere. In some implementations, the shorter the radius, the smaller the area of the view portion of the montage that is displayed in the view.

Other types of panoramic image montages can be similarly displayed. For example, cylindrical montages can be displayed as virtual projections on the inside surface of a cylinder with the view at or near a midpoint, or any other point, inside the cylinder. In some implementations, a view portion of the cylindrical image montage can be displayed in the view based on the current orientation of the view. Some implementations can project the viewable area of the image montage on the curved surfaces of the cylinder, with no image content projected on the flat surfaces of the cylinder. In some implementations, the view can be constrained to one or more particular viewable areas of the cylindrical image montage. In some implementations, image content of the montage can also be displayed on the flat sides of the cylindrical projection, e.g., allowing 360 degrees of viewing of image content of the cylindrical montage. In some examples, an image montage can be displayed on other flat surfaces, e.g., projected onto the flat sides of a rectilinear shape such as a cube, or onto a single flat plane (e.g., a virtual wall). The displayed portion of the image montage can correspond to the orientation of the view. For example, orienting the view in an angular position to the left can scroll the view towards the left along a planar image montage. In some implementations, the viewable area of the panoramic image montage can be constrained to the display area of the image montage so that moving the device to an orientation that would cause a display beyond the display area (e.g., beyond the planar area of a planar montage) will not move the view beyond the border of the display area of the image montage. In various implementations, a particular panoramic image montage may be displayed as a projection on any three-dimensional shape, such as a sphere, cylinder, cube, ovoid, polyhedron, flat or curved plane, etc. e.g., by suitably adapting the panoramic image montage based on the shapes.

In some implementations, the rendered image content of the panoramic image montage can include multiple component image portions that make up the image montage. In some examples, a component image portion can be a still image, e.g., an image having multiple pixels and static content. The viewable area of the panoramic image montage can include still images displayed at various locations on a simulated surface e.g., of a sphere, a cylinder, etc. In some additional examples, a component image portion can be a video clip, animated image, or other animated content, e.g., a cinemagraph or animated GIF image. For example, a video clip or animated image can be played within a defined area at a static location within the image montage. One or more successive image frames can be displayed within the area to display the animation over time. In some implementations, the image frames can be looped for a particular number of times or perpetually, where a sequence of image frames is played back again from a start image frame after an end image frame is displayed.

In some implementations, a still image, video clip, or other component image portion can be moved across the surface of the panoramic image montage independently of the orientation of the view. For example, while displaying a portion of the panoramic image montage, a component video clip can be animated so as to move across the display view, in or out of the display view, and/or otherwise across the image montage. In this context, moving across the montage surface can be in any direction, such as a horizontal direction, a vertical direction, or any other direction along the surface. In some examples, the path of a moving component image portion can correspond to recorded changes in orientation of a camera and/or a device while capturing and storing the image content of that component image portion. For example, as described with reference to FIG. 3, image frames in an image feed can be captured by a camera and orientations of the camera at the times of capture can be stored. In some examples, the image frames captured from a moving camera can be moved across the viewable area (e.g., surface) of a spherical image montage in the same orientation path in which the camera was moved during the capture. In some examples, the camera may motion may include movement of the camera in a direction perpendicular to the montage surface, e.g., towards and away from a scene that is captured by the camera. In still further examples, the camera may be stationary, but configured to capture the scene at a greater magnification, e.g., by zooming in. In various examples, movement of the camera along the montage surface, towards or away from the scene, and zoom operations may be combined in capturing the image feed.

The rendered image content can include one or more of the component image portions that correspond to the display view orientation of the panoramic image montage. In some implementations, the panoramic image montage can be stored as a single image, where the image includes multiple component image portions that have been joined or stitched together. For example, a spherical image montage can be stored as a single rectilinear projection image. Some implementations can store multiple such images that each include multiple component image portions.

In some implementations, the panoramic image montage is provided by displaying individually-stored component image portions, e.g., displaying individual component images as if they are joined together or otherwise part of the panoramic image montage. The component image portions can be individual images, video clips having multiple component image frames, animated images, etc. For example, in block 210, the method can retrieve, from a collection of stored component image portions (e.g., in a data structure), one or more component image portions that are at least partially in the current view portion of the panoramic image montage. In some implementations, each component image portion is associated with a respective orientation. In some implementations, the orientation can be an orientation of the camera in physical space at which the camera captured that image component, e.g., as measured by one or more gyroscopes or other sensors of the device that includes the camera. In some implementations, a component video clip can include a camera orientation for each image frame of the video clip, or for a subset of the image frames of the video clip. These camera orientations may have been previously stored during updates to the image montage (such updating is described below for FIG. 3). The view portions of the panoramic image montage can be constructed for display from the component image portions based on their respective camera orientations. For example, as a mobile device and display view are moved to particular orientations in physical space, the corresponding component image portions that correspond to those view orientations are displayed in the display view. In some examples, the camera orientation for a component image portion can indicate the panoramic orientation or position within the panoramic image montage at which it is displayed (e.g., an angular orientation in a spherical space for spherical image montage).

In some implementations, the component image portions can be associated with place values that indicate a place or ordering of the component image portions in a sequence or order of additions of component image portions to the image montage. The order of place values can be followed when displaying multiple component image portions, allowing overlaying to be provided when displaying the panoramic image montage. In some examples, the place value can be a timestamp value that indicates a time that the associated component image portion was added to the image montage. Component image portions of the view portion can be rendered in an order based on their timestamp values, e.g., in chronological order. In various implementations, a component image portion that is a video can include a timestamp value for each image frame of the video, for the first and last image frames of the video, and/or for other image frames of the video.

In some implementations, one or more individual component image portions can be associated with a time difference value that indicates a time difference that occurred between first and second user inputs that was used in storing the associated component image portion. For example, the associated time difference can indicate a magnitude or setting of one or more parameters that define one or more characteristics of the associated component image portion for display. In some examples, a time difference value can indicate an amount or strength of transparency of the associated component image portion when displayed, e.g., to allow some of overlaid image content of the image montage to be seen "through" the added component image portion that overlays it. The greater the amount of transparency, the more visible is the overlaid image content. The time difference value can also or alternatively be used in other ways, e.g., to indicate a size of the associated component image portion, a shape of the component image portion (e.g., oval, rectangular, circular, star-shaped, or any other shape), or other display characteristic of the component image portion. In various implementations, a component image portion that is a video can include a timestamp difference value that can indicate any of the parameters above, and/or one or more video playback parameters. For example, video playback parameters can include the duration that each image frame of the video is to be displayed, the duration of the full video sequence, whether looping of the video is to be performed (and/or the number of loops to display until displaying a single image frame of the video), etc. In some implementations, the time difference value can be used to make a selection among multiple available selections mapped to different ranges of time difference values, where the selection is based on the magnitude of the associated time difference value. For example, if the associated time difference value falls within a first particular range of time difference values, then, upon display of the associated component image portion, a first filter is selected to be applied to change pixel values of the associated component image portion (e.g., if such a filter has not already been applied to the component image portion). A second range of time difference values can select a second filter different than the first filter.

The panoramic image montage, in some cases, may have image content in some portions (e.g., a subset) of its defined panoramic image area (e.g., viewable display area) and may have no image content in other portions of its panoramic image area. In one example, an example spherical image montage may have image content provided at an orientation corresponding to a particular reference angle (e.g., 0 degrees in both horizontal and vertical rotational planes) and no image content provided at other orientations corresponding to other reference angles. If image content is at least partially provided in the image montage at the same orientation as the view orientation determined in block 208, then that image content (or a portion of the image content) is rendered in the display view in block 210. Portions of the panoramic image area which are positioned in the current display view and do not have image content at the current view orientation can be displayed with default pixels. For example, a default background can be rendered in block 210 in the portions of the panoramic image area of the montage that do not have image content in the display view. For example, a solid-colored background of a particular color (e.g., black, grey, white, etc.) or a particular stored pattern or image can be displayed as a default background for portions of the montage image area where no image content has yet been added.

In some cases, the panoramic image montage having the portion rendered in block 210 can be created for display as a new panoramic image montage. For example, in some implementations, a new panoramic image montage can include no image content (e.g., from user images), and can be rendered with a default background color or pattern signifying a lack of image content. In some implementations, a newly-created panoramic image montage can be provided with a particular initial or base image as a background. For example, the base image can be a default panoramic image designated by a user. In some implementations, the base image can be determined based on a context of or one or more current conditions relating to the device. For example, if image data is accessible from a map database (e.g., a network service that provides maps), image data depicting the current surroundings at the current geographic location of the device (e.g., as determined using a GPS, via triangulation, or other techniques) can be retrieved from the map database and set as the base image. In some implementations, panoramic images can be obtained from a user's storage, shared storage, or publicly-accessible storage and can be based on contextual factors or related conditions for the device or data accessible by the device, if user consent has been obtained for accessing and using user data and/or characteristics related to particular users.

In some examples, the image content used as the base panoramic image montage can be based on other characteristics or conditions, e.g., the current time of day or date (e.g., images related to a holiday, season, etc. if current), a current geographic location of the device, a current activity or event indicated in a calendar or other user data, content of images or messages sent or received by the device (e.g., within a threshold time before the current time), environmental sound detected by the device (e.g., music, voice, etc.) by one or more microphones of the device within a threshold time before the current time, etc. In further examples, the montage background image can depict weather similar to current weather at the current geographic location of the device, depict users who are at the current location of the device and who are socially-networked with the user of the device (if consent has been obtained from those users), depict an object, character, setting, story event, or other content associated with a particular current location of the device (e.g., image of food if the location is a restaurant, image of a scene from a movie if the location is a theater showing that movie, image related to a theme of location that is an amusement park, etc.), depict an image from a movie mentioned in a message from the user in a recent chat, etc.

Some implementations can display one or more user interface elements over the display of the panoramic image montage. For example, a grid following the curvature of the panorama montage surface (e.g., spherical) can be displayed in the display view, e.g., if the view portion of the image montage is blank or shows just a background. User interface elements can indicate one or more directions within the viewable area of the image montage to view one or more particular image portions of the image montage, such as one or more recently-captured image frames that have been added to panoramic image montage. In some examples, a panoramic image montage may have blank or background areas between image portions of the montage, so that some image portions may not be readily viewed without changing the view orientation. The location or orientation of some image portions in the montage may not be known to the user. Thus, the montage location of some image portions can be indicated graphically in the display view. For example, an arrow can point in a direction of the nearest image portion or a specific image portion. In another example, a line can be displayed in the view that can guide a user to a particular image portion, such that if the line is followed in the display view by changing the view orientation, the particular image portion is reached and displayed in the display view. Some functions such as tutorials and help functions can display arrows, lines, and other graphical user interface elements to assist the user in finding particular image portions in the viewspace area of the panoramic image montage.

Some implementations can sense other motions or positions of the device or a user, which can affect the display of the view portion of the panoramic image montage. In some examples, one or more accelerometers of a mobile device that is displaying the panoramic image montage can sense whether the device translates in space, e.g., is linearly moved in space. The display of the image montage can be adjusted based on this translation. For example, if the device is moved linearly toward or away from the user, it can be interpreted as if the user is leaning toward or away from the view portion of the image montage. In response, displayed image content can be shifted or distorted by an amount in accordance with the amount of linear movement to mimic a 3D effect, as if the user were changing perspective for viewing the image content of the image montage. For example, displayed image content can be flattened in presentation if the view is sensed to be moving linearly toward the montage projected surface. In some implementations, a 3D effect can cause depicted objects to change in shape in accordance with the linear motion, e.g., by foreshortening long objects, extending other objects, etc.

Some implementations can display virtual 3D objects within the simulated 3D space of a panoramic image montage such as a spherical or cylindrical image montage. For example, in a spherical image montage, a 3D object can be displayed between the display viewpoint and the spherical surface. As the view orientation and view portion of the image montage changes, the 3D object can be adjusted in orientation and/or position in accordance with these changes. Such 3D objects can be independently added to or removed from the panoramic image montage, or can be associated with particular image portions of the panoramic image montage. For example, the 3D object can be removed from display in response to an associated image portion being overlaid by other image content. Some implementations can project image content of the panoramic image montage onto a virtual surface of a displayed 3D object within the display view.

In block 212, audio can be output in some implementations, which is derived from audio data that is associated with the panoramic image montage and/or with the view portion of the image montage rendered in the display view. In some examples, the audio can be output from one or more speakers, headphones, or other output audio devices of the device or in communication with the device. In some implementations, particular audio data can be used to output audio regardless of which view portions of the image montage are being displayed. In some implementations, different portions (e.g., files) of audio data can be used for output depending on the particular view portion of the image montage currently being displayed in the display view. For example, a particular image portion (e.g., an image frame, video clip, etc.) of the panoramic image montage can be associated with particular audio data, such that the particular audio data is used for audio output if its associated image portion is being displayed in the display view (e.g., the center of the display view is showing the particular image portion). Different image portions can be associated with different audio data based on the content of the image portions and the audio can be output when the associated image portion is displayed in the display view. For example, an image portion depicting a calm forest or calm ocean can be associated with calm music, a video depicting fast motion can be associated with an energetic music with fast beat, etc.

In some implementations, stereo or three-dimensional sound can be provided within a simulated three-dimensional (3D) space associated with the panoramic image montage. For example, a spherical image montage can provide a simulated 3D space within its 360-degree view. Simulated audio speakers can be positioned at particular locations within the simulated 3D space such that audio is varied in output based on a view orientation of the display view, e.g., based on the locations of the audio speakers with respect to a displayed portion of the spherical image montage. 3D sound effects associated with objects displayed in the image montage can be output based on the position of the objects with respect to the current view of the image montage.

In block 214, it is checked whether an update is to be performed to the panoramic image montage, e.g., based on received user input. The update can cause one or more portions of the panoramic image montage (e.g., "update portions") to be overlaid (e.g., covered or replaced) with new image content data. For example, the user may have provided user input such as touch of a touchscreen of the display view, selection of displayed control(s) in the display view or on a display device, or movement of a displayed cursor and input control activation(s) via a physical button or other input device, spoken one or more voice commands, or otherwise provided input indicating to update the panoramic image montage. In some implementations, multiple users via connected devices can provide input to update the panoramic image montage. If an update is determined to have been requested, then the update to the panoramic image montage is performed, if appropriate. Some examples of determining whether an update is to be performed and performing such an update to the panoramic image montage are described below with respect to FIG. 3.

In block 216, some implementations can determine whether playback of historical changes to the panoramic image montage is to be provided. In some examples, user input can be received which selects an option to provide such playback by displaying the changes on a display device, e.g., in the display view. In some examples, the playback can be provided based on one or more other conditions occurring, e.g., based on a time or date, in response to a message or notification, based on a current location of the device, based on a current activity or event, based on other user input indirectly related to the playback, etc. If no such playback is to be provided (e.g., at the current time), the method continues to block 220, described below. If such playback is to be provided, then in block 218 historical addition and/or removal of image content to portions of the panoramic image montage are displayed over time, e.g., in the display view.

In some examples, the playback of historic changes to the panoramic image can be displayed in the display view as the addition or removal of component image portions of the panoramic image montage. The playback may be based on previous addition or removal of these component images as directed by the user (and/or other users), at appropriate times relative to the addition and removal of other component image portions to and from the panoramic image montage. For example, multiple layers of component image portions can be stacked on the panoramic image background, added at different times, and removed in some cases. Later-added image content can be positioned over previously-added image content that is at least partially in the same display area of the panoramic image montage.

In some examples, the playback can be in a forward direction or reverse direction. For example, in a forward direction, later-added image content can be shown to appear in particular regions of the panoramic image montage where that image content did not previously appear, e.g., in an order that the user previously added the image content to the panoramic image montage. This may be based on a timestamp value or other place value associated with each component image portion. In some cases, the later image content can overlay image content previously added in the particular regions. Similarly, image content that had been removed can be removed from the display view in the same order it had been removed in the past relative to additions and other removals of image content. In some implementations (e.g., using individual component image portions), removing image portions can reveal in the display view, image content that had been previously added in the same area and which was underneath the removed image portion. In some implementations, overlaying image content of the panoramic image montage can be partially transparent so that overlaid image content can be partially displayed through the overlaying image content. In another example, in a reverse direction of playback, image portions can be removed from areas of the panoramic image montage in the reverse order they had been previously added, and can be added to areas of the panoramic image montage in the reverse order they had been previously removed. In another example, playback may be performed without regarding to the timestamp value, e.g., image portions may be changed arbitrarily in the display view.

In some implementations, the playback can be displayed at a particular rate of addition and removal of image content to the panoramic image montage. For example, the rate can be selected by the user, e.g., during playback, stored as a user preference, etc. After the playback is displayed, the method can continue to block 208 in some implementations, to continue to detect the orientation of the display view for rending the panoramic image montage.

In block 220, options can be displayed in some implementations to allow selection of other panoramic image montages accessible to the device. In some examples, the other panoramic image montages can be shared images stored on servers, other devices or storage connected to the network, etc. For example, these other panoramic image montages can include panoramic image montages having image content similar to the image content in the panoramic image montage being rendered in block 210 on the accessing device. In some examples, if user consent has been obtained from the users associated with the images, the system can search accessible panoramic image montages for image content that depicts the same or similar faces, objects, or other features as depicted in the rendered panoramic image montage. Such similarities can be detected using, for example, image recognition techniques that can detect and classify types of image content features (e.g., faces without detecting identity, animals, types of articles or other objects, landscape, sky, foliage, other geographic features, etc.). The similarities can be detected by checking other information, including metadata indicating the geographic location at which one or more component images of the other panoramic image montages were captured, time of day for such capture, day of year for such capture, etc. In some implementations, the system can check for similarities including social connections of the users associated with the other panoramic image montages with the user associated with the rendered panoramic image montage, if user consent has been obtained. After searching the other panoramic image montages, the system can display one or more options to select one or more of these other panoramic image montages that were found to be similar to the rendered panoramic image montage.

In block 222, it is determined whether one of the other panoramic image montages is selected. For example, an image montage can be selected by user input provided by the user, including any of various types of user input as described herein. If none of the other panoramic image montages are selected, the method can return to block 208 in some implementations, to continue to detect the orientation of the display view for rending the panoramic image montage. If one of the other panoramic image montages is selected, then the method continues to block 224, in which the selected panoramic image montage can be displayed in the display view. For example, the selected panoramic image montage can be displayed in place of the rendered panoramic image montage previously displayed, and various portions of the selected panoramic image montage can be displayed based on the orientation of the display view, similar to the replaced panoramic image montage.

The method continues to block 208 to continue detecting the orientation of the display view for rendering the selected panoramic image montage.

In some implementations, various display and update options can be provided with respect to selected other panoramic image montages. For example, options can be automatically selected based on stored user preferences, or can be selected based on user input provided in a user interface displayed on a display screen of the device. In some examples, one or more image portions of a selected other image montage can be added to a previously-rendered panoramic image montage, e.g., if the system is indicated to do so by selected options. For example, empty or background areas of the previously-rendered image montage can be filled in or overlaid with image portions of another selected image montage that correspond in position or orientation to the empty areas (e.g., the image portions have the same or similar position or orientation, e.g., within a threshold range). Some image portions of the previously-rendered image montage can be overlaid (e.g., replaced) by image portions of a selected other image montage based on one or more conditions. For example, the replacing image portions can depict a same or similar type of image feature as the replaced image portions (e.g., faces, animals, landscape feature, etc.), and/or can have visual characteristics that have particular values closer to a threshold or target value than the replaced image portions, e.g., for blurriness, brightness, contrast, color value, etc. For example, blurry portions of the previously-rendered montage can be replaced by corresponding sharper portions of the selected montage. In some implementations, the replacing image portions can be selected by the user by moving the display view to display the replacing image portions and providing user input to the device to select the displayed image portions. In some implementations, image portions to be replaced in the rendered image montage can be similarly selected.

Some implementations can allow user input or preferences to select a particular image portion for display from a group of multiple available image portions located at a given position or orientation of a panoramic montage. In some examples, the multiple image portions at a given position can each be derived from a respective panoramic image montage of multiple image montages, or the multiple image portions can be all associated with a single panoramic image montage. For example, the multiple image portions at a given orientation can be stacked in layers, e.g., overlaid on each other such that the topmost (e.g., latest added) image portion is visible in the display. Lower layers of image portions can be displayed by the device as directed by user input such that a user can select one of the image portions that are within the stack to be visible. Selected image portions can be displayed at different positions in a previously-rendered panoramic image montage, e.g., in blank areas of and/or on overlaid image portions of the previously-rendered image montage. In some implementations, an option can be selected by user input to display a panoramic image montage in a standard mode in which a standard set of image portions of that montage are displayed. Options can also be provided to automatically select different image portions to display at given positions or orientations of the montage based on one or more factors. For example, the factors can be related to the user, e.g., based on stored user preferences and/or user input. For example, the factors can include user preferences for types of image content, capture date, geographic location of capture, and other characteristics of image portions. Based on such factors, the image portions at a particular orientation or position can each be scored and the strongest scoring image portion can be displayed at that particular orientation or position of a rendered montage.

Some implementations can allow the user to select multiple other panoramic image montages (e.g., in blocks 220-222), and/or the system can display multiple selected image montages. Multiple image montages can be selected from the user's image montages, other shared image montages created by other users, etc. In some examples, one of the selected image montages is displayed at a time. In further examples, image content from multiple image montages can be simultaneously displayed, e.g., with partially transparent image content such that image content at corresponding orientations (e.g., at corresponding positions within the montage) can be simultaneously displayed from multiple image montages.

In additional examples, one or more particular portions of one of the selected panoramic image montages can be determined and displayed overlaying the portions of other selected image montages at the corresponding orientation, e.g., automatically and/or based on user input, user preferences, user data (if user consent is obtained), device states or conditions, etc. For example, image montage portions from different image montages may be displayed which have a highest display priority at various orientations of the panorama based on one or more factors, allowing portions from different image montages to be displayed at various orientations of a rendered panoramic view, e.g., creating a combined panoramic image montage. In some examples, the factors can include the type of image content features depicted in the portions of the image content (e.g., faces or certain types of objects may have a higher priority), the time of capture of the portions (e.g., portions having more recently added or captured image content, or portions having image content captured in a specified time range, may have a higher priority), the geographic location of capture of the portions (e.g., particular locations may have a higher priority), etc. The priorities of particular factors relative to each other, and priorities of different types or values relative to each other within a factor, can be determined based on stored user preferences, user input, user data (if user consent has been obtained), etc.

Furthermore, priorities of montage portions can be individually determined at particular orientations of the panoramic image montage based on particular factors (e.g., as in the examples above) and/or weights of factors for montage portions at those particular orientations. For example, in a spherical image montage, an orientation directly overhead (e.g., orienting the view or device to be pointing directly up, 180 degrees from the ground) can be associated with a particular associated set of factors and/or weights for factors that are used to assign priorities to the corresponding portions of the multiple image montages at that orientation. In some examples, image content depicting features such as sky, sun, or clouds may be assigned a higher priority than image content showing a ceiling or other image features at the directly overhead orientation. In one such example, a portion of one of the image montages that depicts sky can be assigned a higher priority to be displayed overlaying the other portions of the other image montages at that orientation that do not show prioritized features. Similarly, horizontal orientations of the panoramic montage (e.g., level with the ground) may be associated with a different set of factors that are used to assign priorities. For example, for such horizontal orientations, image portions having faces, horizons, and landscape content features, or image portions captured at particular geographic locations or in a particular time range, can be assigned a higher priority than image portions depicting other types of recognized features, captured at other times, and captured at other geographic locations.

In some of these implementations, for a particular montage portion at a particular orientation (e.g., an image portion of the image montage), each of the priority factors can be assigned an individual priority (or weight) based on characteristics of the montage portion, and the individual priorities can be combined (e.g., summed) to obtain an overall priority for that montage portion to be displayed at that orientation of the panoramic view. The overall priorities can be compared between corresponding image portions (e.g., at least partially occupying the same areas) at that orientation of the multiple image montages. The highest priority montage portion can be displayed on top, overlaying the portions of the other image montages. In some implementations, the montage portions can be stacked in a display order based on these overall priorities, and displayed as if stacked in layers.

Some implementations can associate one or more particular geographic locations with a panoramic image montage. For example, a panoramic image montage and its image portions can be accessible to users (e.g., able to be selected and its data received for display, e.g., over a communication network) if the user is within a threshold distance of a geographic location associated with that image montage. In some implementations, a panoramic image montage can be automatically selected and displayed on a device of a user based on the current geographic location of the device. In some examples, as the user and device move to different geographic locations, a panoramic image montage associated with the current location is displayed on the device when within a threshold distance of the location. In some examples, the image montage can include image content that is thematically associated with the associated geographic location, e.g., depicting scenes captured from a threshold area around that location.

Figure 3:
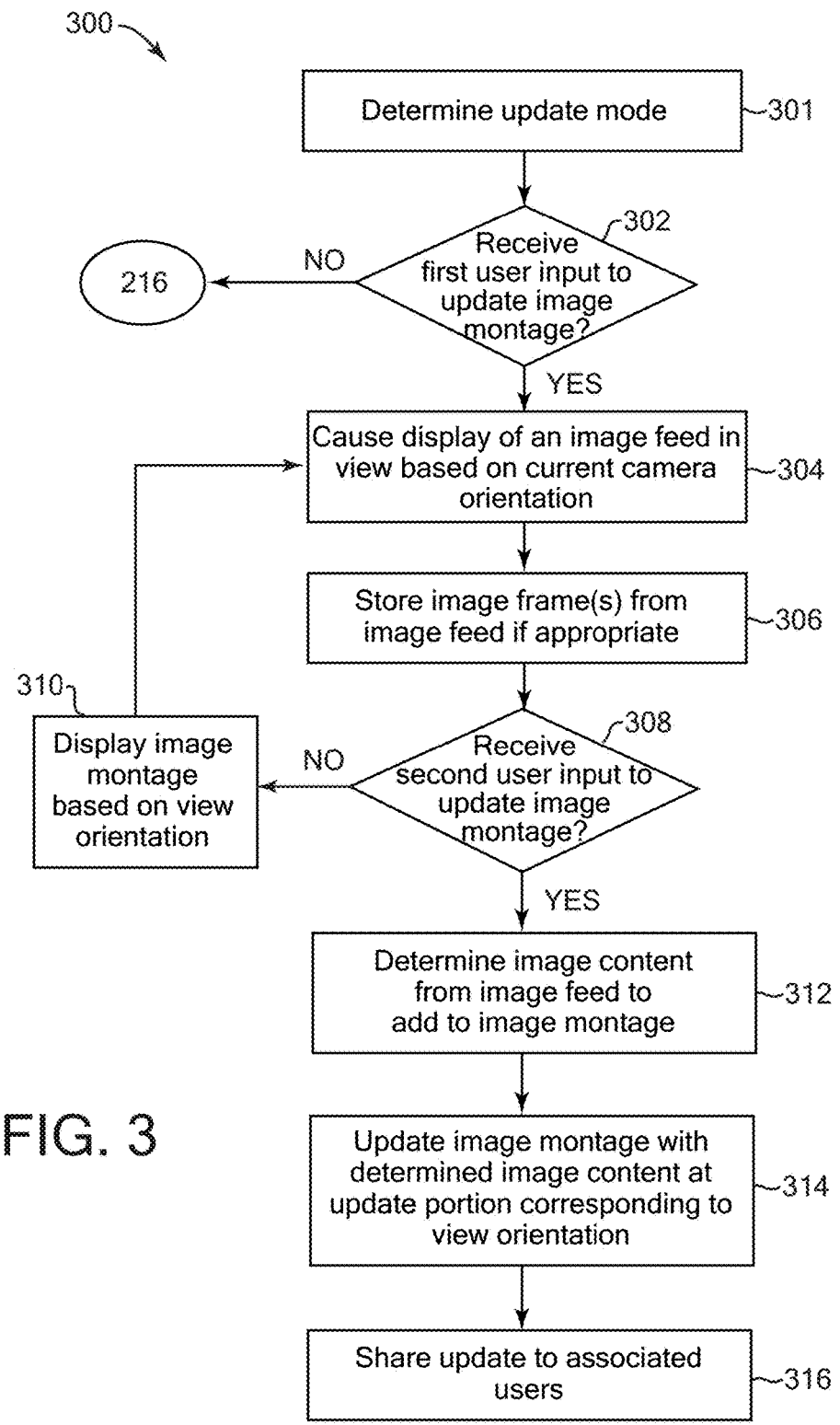
FIG. 3 is a flow diagram illustrating an example method to determine whether an update is to be performed to a panoramic image montage and perform the update, according to some implementations.

FIG. 3 is a flow diagram illustrating one example method 300 in which it is determined whether an update is to be performed to a panoramic image montage and the update is performed if appropriate. For example, method 300 may be used to implement block 214 of the example method 200 of FIG. 2. In some implementations, method 300 can be performed for a panoramic image montage that is being displayed by a device as described in FIG. 2, such that updates to the image montage can be displayed in the image montage after the update is performed.

In block 301, an update mode can be determined. Some implementations can provide different modes for updating the panoramic image montage, where user input from the user can select one of the modes of operation for the update. For example, a single image update mode can be selected, in which a single static image (e.g., image frame) is captured and a portion of the panoramic image montage is updated with the single image frame or a portion of the single image frame. Some implementations can provide a video update mode, in which multiple image frames are captured which are displayable at the same position in sequence to provide an animation. A portion of the panoramic image montage is updated with the multiple image frames or a subset thereof, e.g., where a set of the image frames can be played in a repeating loop at one position in the panoramic image montage. Some implementations can provide other update modes, e.g., a drawing mode in which image editing functions are provided to allow the user to edit the panoramic image montage with generated shapes, lines, filters, or other pixel edits.

In block 302, it is determined whether first user input is received that commands an update to the panoramic image montage. The first user input can take a variety of forms in various implementations. In one example, the device is a mobile device having a touchscreen that displays the panoramic image montage, and the first user input can be a touch of the user on a location of the touchscreen that is included in the display view and displaying the panoramic image montage. Such an implementation allows a user to orient the mobile device in space such that a particular portion of the panoramic image montage corresponding to the device orientation is displayed in the display view, and then touch the touchscreen while the particular portion of the image montage is being displayed in the display view. For example, the particular portion can be a portion of the montage to be updated.

The first user input can also or alternatively take other forms. For example, a selection of a displayed button or physical button on the device, gesture input on a touchscreen (e.g., finger swipe, one or more finger taps, etc.), or selection using an input device connected to the device, may have been provided by the user. A voice command from the user can be received via one or more microphones, e.g., of the device. A motion command including one or more predetermined motions of the device in space (e.g., a quick motion toward or away from the user, a shake of the device, etc.) may be provided as first user input.

If first user input has not been received, the method can continue as shown in FIG. 2, e.g., the method can continue to block 216 or other block of FIG. 2. If first user input has been received as determined in block 302, then in block 304, an image feed can be caused to be displayed. For example, the image feed can be displayed in the display view that also displays a view portion of the panoramic image montage. In some implementations, the image feed is a live feed that includes image content being captured by a camera in communication with the device displaying the display view. The image content of the live feed can include a plurality of image frames, such as image frames being captured live by the camera over time according to a capture frame rate and, in some cases, stored on accessible storage. In some examples, the live feed can include image frames captured from a back camera on the back of a handheld mobile device, e.g., on a side of the device opposite to a main display screen. In another example, the live feed can include image frames captured from a front camera on the front of the mobile device, e.g., on the same side of the device as the main display screen. Some implementations can provide a control (e.g., displayed in the view or a physical control of the device) that selects between a front camera and a back camera of the device to provide the live feed. Some implementations can provide a control to select one of multiple available zoom levels of the camera capturing the live feed to provide a particular zoom level for the image frames of the live feed. In some implementations, the image frames of the live feed can start to be captured (and not displayed) before the first user input is received (e.g., at a time after the panoramic image montage is displayed in FIG. 2), and currently captured image frames are displayed in response to receiving the first user input. In some implementations, such prior start in capturing image frames can allow immediate display of the live feed upon receiving the first user input.

In some implementations, the live feed can overlay part of the displayed portion of the image montage in the display view, e.g., as an opaque live feed view such that the overlaid part of the image montage is fully obscured. In some implementations, the live feed can be displayed as partially transparent such that the part of the image montage that it overlays is partially displayed through the overlaying live feed.

The live feed can be displayed at different locations of display view in various implementations. For example, the live feed can be defined to display its image frames within a live feed view which can be positioned at the center of the display view, e.g., with the center of the live feed view located at the center of the display view. In other implementations, the live feed view can be positioned at other locations of the display view, e.g., a location associated with the first user input. For example, in an implementation in which the display view is displayed on a touchscreen and the first user input is touch input from the user on the touchscreen within the display view, the live feed view can be centered on the location of the display view that was touched by the user.

In some implementations, the live feed view can have different sizes and/or shapes. For example, a default-shaped live feed view can be displayed, unless user input or user preferences select a different size and/or shape of live feed view. In some examples, user input can be received before receiving the first user input of block 302, where the user input selects a particular size and/or shape of live feed view. For example, a displayed menu option can be selected by a user to toggle between multiple different live feed view size selections. Some implementations can read stored user preferences that were previously designated by the user, and which indicate the size and/or shape of the live feed view. In some examples, the live feed view can be a small size, e.g., a fraction of the size of the display view, or can be a larger size, e.g., up to a size and shape covering the entire display view. Examples of different shapes of live feed views can include rectangular, rectangular with rounded edges, circular, oval or elliptical, star-shaped, hexagonal, irregularly-shaped, or user-customized views.

In addition, in some implementations the device can store an indication of the time that the first user input was received. For example, the time of initially receiving the first user input can be stored. In some implementations, this time of first user input can be used in determining an update to the image montage, as described below.

In some implementations in which a video update mode is selected, the received first user input can be considered a command to start the storing (e.g., recording) of image frames from the live feed as a video sequence. The method can initiate such recording by storing received image frames of the live feed in accessible storage, and in some implementations, storing associated camera orientation, view orientation, and/or timestamp information as well, as described below.

In some implementations, the received first user input can be a command to start the storing of audio data associated with the image feed, e.g., recording audio that is received from one or more microphones of the device displaying the image feed. The recording of audio can be performed for a predetermined length of time after the first input, can be performed until the second user input is received (described below), etc. Image frames stored from the image feed can be linked with particular stored audio data recorded at the time those image frames were displayed in the image feed view.

In some implementations, an image feed can be used that is not displaying images that are being captured live by the camera, e.g., in place of the live feed described above. For example, the image feed can be a video feed providing image frames from a stored data such as a video file, a previously-recorded video feed, or other video data or image data stored on accessible storage, or the image feed can provide image frames from a stored animated image such as a cinemagraph. Image frame(s) displayed from stored data in the display view can be used for features described herein instead of image frame(s) displayed from a live feed. In various implementations, the image frames captured by the camera for the live feed or other type of image feed may be two-dimensional and/or three-dimensional. For example, three-dimensional image frames can include depth information and/or other information allowing three-dimensional viewing of the image content.

Some implementations can use a location in the display view associated with the first user input to provide other commands or parameters. For example, in implementations where the device is a touchscreen device and the user input is received via the touchscreen, the input location of the first user input (e.g., touch input on the touchscreen device) can indicate or select a portion of the panoramic image montage that is displayed in the display view at the input location. In some examples, the input location of a user touch can indicate or select the center of an update portion of the image montage that can be updated as described below. Some implementations can use an input location associated with a second user input (described below) in a similar manner. The input location can be provided in other ways in other implementations, e.g., via an input device, voice command, etc.

In block 306, one or more image frames received in the image feed can be stored, in some cases or implementations.

For example, if a video update mode has been selected, then receiving the first user input as detected in block 302 can cause the initiation of recording a video clip, which will include a number of image frames from the image feed. In some update modes, reception of the first user input may not cause the image frame of the image feed to be stored, e.g., until a second user input is received as described below.

In some implementations, the system can determine and store an orientation of the camera and/or an orientation of the display view (e.g., device) in association with each image frame from the image feed stored in block 306. The camera orientation can indicate the orientation of the scene being captured in the image frame. The view orientation can indicate which view portion of the image montage is being displayed in the display view at the time the image frame is stored. In some implementations, the view orientation corresponds to the camera orientation, e.g., if the camera and view are both provided on a mobile device. The time that each image frame is received and/or stored can also be stored, e.g., as associated timestamp values. For example, the stored image feed data, orientations, and timestamp values can be used to update the image montage, as described below.

In block 308, it is determined whether second user input is received that, e.g., commands an update to the panoramic image montage. The second user input can indicate to the device to update the panoramic image montage with image content from the image feed. In a video update mode, the second user input can be a command to stop recording of image frames from the image feed.

The second user input can take a variety of forms in various implementations. In one example, the second user input is a removal of the user's touch or press from a touchscreen, button, or other device sensor. In one example, the device is a mobile device with camera on one side and touchscreen on a second side, and the first user input was a touch of the user's finger on the display view displayed by the touchscreen. This touch is then ceased, e.g., by the user removing the finger from the touchscreen, which was received as the second user input. Such an implementation allows a user to touch the view when desiring to see an image feed, maintain the touch of the first user input to, e.g., determine one or more parameters (described below) and/or move the camera on the device to a different orientation, and release the finger to provide the second user input and cause an update to the image montage. In some implementations, the second user input can be other forms of input, e.g., a selection of a different button or user interface element than used for the first user input, a tap or press of a control a second time (after a first tap that provided the first user input, where a tap is a touch of a short duration, e.g., a momentary touch followed by immediate removal of the touch), a gesture, a voice command, a motion command, or other input.

If second user input is not received in block 308, then in some implementations the method can continue to block 310. In some implementations, the first user input can continue to be active (e.g., maintained). For example, touch input can continue to be active by continuing to touch a finger on a touchscreen or continue pressing a button or other control, rather than releasing the finger immediately after the initial touch. In some cases, the first user input can be maintained until the second user input is provided as described below. In some implementations, the first user input can be considered to be continually active until receiving the second input. For example, a tap of a touchscreen can be considered a first user input, which is considered active without the user having to hold his or her figure on the touchscreen, until receiving the second user input, e.g., a second tap.

In block 310, the panoramic image montage is displayed in the display view based on the current view orientation. For example, if the view orientation is changed after the first user input but before the second user input is received, the changed orientation can cause a different portion of the panoramic image montage to be displayed in the display view.

In some examples, during active first user input, the display view may change in view orientation and change the view portion of the image montage displayed in the display view. In some examples, for some mobile device implementations, the user can hold his or her finger on the display view of a device touchscreen as first user input and, while holding the finger on the screen, move the device in space to change the orientation of the device and thus change the orientation of the display view on the display screen of the device. For example, the user can tilt or rotate the device, or provide other view orientation input. This causes the view portion of the image montage displayed in the display view to change to a different view portion of the image montage in accordance with the change in view orientation.

In some implementations, the view portion of the panoramic image montage is not changed at block 310, e.g., block 310 can be omitted, or is performed specifically in response to particular user input. For example, this feature can allow a user to select to set or lock the display view to display a particular view portion of the image montage that was displayed at the time of receiving the first user input. In some implementations, receiving a user selection of a button or other control can initiate this feature.

After block 310, the method can return to block 304 to cause (e.g., update) the display of the image feed in the display view, e.g., based on the current camera orientation, while the first user input is active and before the second user input is received. For example, new image frames displayed in the image feed view can be received and displayed, and these new image frames may depict different image content than previous image frames due to changes in subject matter in captured scenes and/or due to changes in orientation of the camera providing a live feed. In some examples, a scene of capture of the camera may change as the camera is moved in space with the device.

Some implementations can modify the display of the display view to maintain display of image frames from the image feed overlaid on the image montage at one or more portions of the image montage that the display view is moved over while the first user input is active. In some examples, an image "trail" of feed images can be displayed behind the image feed as the image feed view is moved with respect to the image montage while the first user input is active and before the second user input is received. Such a trail of feed images can be displayed as blurred or smeared images in some implementations, e.g., as the image frames from the image feed are blurred with additional, later-captured feed image frames in the image trail. In some implementations, the image montage can be updated with the image frames in the image feed image trail. For example, the update can be performed at the time of the display of the image frames in the trail or at a later time (e.g., in block 314 described below). For example, if the update of the image montage happens at a later time, the image frames of the trail and their orientations and times can be stored by the device, e.g., in temporary memory, before an update of the image montage is performed.

In some implementations, movement of the image feed view does not cause a display of an image frames trail behind the image feed view as it is moved relative to portions of the image montage while the first user input is active and before the second user input is received.

Some implementations can provide a drawing mode in which the user can select a "brush" from a displayed user interface. The brush can be of similar size and/or shape to the image feed view and can provide a desired color, pattern, etc. to display instead of the image frames of the image feed. The user can draw brush pixels onto the surface of the panoramic image montage by moving the view orientation (and/or camera orientation) while in the drawing mode. For example, the brush can be located at the center of the display view and can create a trail of added pixels behind it as the view orientation is changed, e.g., by the user changing the device orientation.

If second user input is received in block 308, then the method continues to block 312. In block 312, image content is determined, where this image content is to be added to the panoramic image montage as an update to the image montage. In some examples, the image content can be obtained from the image feed. For example, if a still image update mode is active, the determined image content can be a single image frame displayed by the image feed, e.g., at the time the second user input is received. This single image frame can be based on the orientation of the camera at the time the second user input was received, e.g., based on the scene captured by the camera for the live feed. For example, in some mobile device implementations, the image captured by the camera is based on the orientation of the camera, where the camera's orientation is based on the orientation of the device on which the camera is located. In some implementations, the orientation of the display view can also be based on the orientation of the device, as described above. In some examples, the single image frame can be stored in accessible storage at the time the second user input is received.

In some implementations, e.g., if a video update mode is active, the determined image content can be a video clip or sequence of multiple image frames obtained from the image feed. For example, the determined image content can be the image frames that were displayed in the image feed during a time interval (e.g., time period) between receiving the first user input and receiving the second user input, and were stored during that time period. In some implementations, these image frames can include a last image frame that was displayed in the image feed at the time the second user input was received. In some implementations, the determined image content can be retrieved from a different source, e.g., an image, video data, or an animated image stored in accessible storage.

In some implementations, the determined image content can be modified before being applied as an update to the image montage. In some examples, the determined image content can be modified based on user input, e.g., the first user input and/or the second user input. For example, the time period between receiving the first user input and receiving the second user input can be used as a parameter that controls modifications to the determined image content. For example, this time period can determine a magnitude of a modification, such as a magnitude used in applying a filter to the determined image content.

In some examples, an amount of transparency of the determined image content can be determined based on the time period, where a higher transparency can allow existing montage image content to be displayed through overlaying new image content. For example, the longer (greater) the time period, the more opaque the image content. A shorter (lower) time period causes more transparent image content to be added to the image montage in comparison to a longer time period. In one example, if the image content is an image frame, and the time period between the first and second user input is relatively short, the image frame may be modified to be more transparent compared to a longer time period between the first and second user input that causes a more opaque image frame, e.g., up to a threshold amount of time beyond which the image frame is made fully opaque (e.g., not modified).

In some implementations, the time period between first and second user inputs can also or alternatively control a size associated with the updating of the image montage by the image content. For example, the size of the image frame(s) to be added to the image montage can be based on the time period. For example, the greater the time period, the larger the image frame that is added. In some examples, the user touches a touchscreen (as first user input) for a short time before releasing (as second user input) to cause a smaller image frame to be captured by the camera. If the user holds the touch on the touchscreen, the image frame grows in size, e.g., up to a largest size after a threshold amount of time, until the finger is released. In some implementations, a full sized image frame can be cropped to a selected smaller size (e.g., cropped around the center of the image frame), or the image frame can be reduced in size (e.g., pixel resolution) proportionally to the selected smaller size. In some implementations, the size of the area of the update portion in the image montage that is overlaid or replaced by the image content is based on the time period between first and second user inputs. For example, the greater the time period, the larger the area of the update portion of the image montage that is overlaid.

In some implementations, the time period between first and second user inputs can control other modifications. For example, a magnitude of one or more other filter(s) can be controlled by the time period. For example, the time period length can control a strength of the applied filter. Such filters can include any visual image filters to modify image characteristics, pixel characteristics, or visual patterns, e.g., brightness, contrast, blurriness, sharpness, etc., change color to black and white or vice versa, create visual styles (e.g., patterns, sepia tones, etc.), change aspect ratio, change pixel resolution, rotation, etc.

In some implementations, the time period between first and second user inputs can be used to select one or more options or commands from a set of available options or commands. Such options or commands can modify the determined image content, or can be used to select other device functions. For example, as the time period increases before the second input is received in block 308, different options or commands can be displayed in the display view, and a displayed option or command can be selected or executed in response to the second user input being received. In one example, labels identifying different types of filters can be sequentially displayed as they become selectable during an increase in the time period, until the second input is received, which causes the filter identified at that time by the displayed label to be selected. The selected filter is then applied to the determined image content. Any types of options, selections, or commands can be similarly provided.

The image content can be modified in other or additional ways before being added to the image montage. In some examples, the size of an image frame can be automatically increased or decreased to fit within the determined update portion of the image montage. For example, an image frame to be added can be altered to have a higher or lower pixel resolution to match or otherwise fit the resolution of the update portion of the image montage that will receive the image frame.

Some implementations can also determine audio data to accompany the determined image content. For example, the audio data can encode audio received by one or more microphones at the time the determined image content was captured and/or displayed in the image feed. This audio can be associated with the determined image content.

In block 314, the panoramic image montage is updated with the new image content determined in block 312, at one or more update portion(s) of the image montage that correspond to the orientation(s) of the display view at the time(s) the image content was captured. In some examples, the determined image content is an image frame captured at the time that the second user input was received. In some implementations, this image frame is added to the panoramic image montage at an update portion of the image montage that was displayed "behind" the image feed view at this time. In some examples, the image frame can be added directly over the portion of the image montage underneath the image feed view in the display view. The added image frame can be an overlay that overlaps and obscures the covered existing image content at the update portions, or partially obscures the existing content, e.g., if the new image frame is partially transparent, if the new image frame is smaller than an existing image portion, etc. For example, the added image frame may overlap portions of one or more existing component image portions of the image montage, depending on the particular area of the image montage that is overlaid by the added image frame.

As described above, the added image content can be overlaid on one or more image portions of the panoramic image montage, e.g., at least partially obscuring the overlaid portions. In some implementations, e.g., where the image montage is provided as a (whole or partial) single image having multiple component image portions stitched together into the single image, the overlaying can include replacing the overlaid image content with the added image content. For example, the pixels of the added image content can overwrite (e.g., be inserted into) the appropriate locations in a single image. In an example, the corresponding pixel values of the overlaid image content in the single image can be replaced (e.g., overwritten) with the pixel values of the overlaying image content. In some examples, if the added image content is partially transparent, the replacing pixels can be altered, e.g., by being blended with the overlaid pixels, before replacing (e.g., overwriting or discarding) the overlaid pixels in the image montage. In some examples, if the added image content is partially transparent, pixels of both the added image content and the overlaid pixels may be retained and blended at a time of display of the panoramic image montage. Some implementations can find particular image pixels to be replaced in the single image (e.g., corresponding to the overlaying pixels) before adding the pixels of the overlaying image content to the single image. For example, image object recognition and detection (if user consent has been obtained) can be used to find existing image features of the image montage that will be replaced with added image content (e.g., similar image features) from the image feed or other source. In some implementations, existing pixels of the image montage can first be removed before being replaced, e.g., the existing pixel values can be set to default values. In some implementations, existing pixel values can be stored in accessible storage before being replaced, e.g., for possible reconstruction or restoration of the replaced pixels at a later time.

In some implementations, the image montage can be a collection of individual component image portions that are stored individually, e.g., referenced in a data structure, where one or more component image portions are displayed to construct the view portion of the image montage. Component image portions that are overlaid by the added image content are not removed or deleted, and are retained in storage and not displayed. The added image content can be added to the collection of component image portions. For example, the added image content can include one or more image frames, which can be each stored as an individual component image portion. In some implementations, each added component image portion can be stored in association with a camera orientation (e.g., capture orientation) indicating the orientation of the camera at which that component image portion was captured, and in association with a place value (e.g., timestamp value) indicating the place in the order of added components at which the component image portion was captured. A system can refer to the camera orientation and/or timestamp value when rendering portions of the image montage that include the component image portions, as described above with respect to FIG. 2.

In some implementations, the added image content is a video clip, e.g., a defined area in which multiple frames are to be displayed in sequence. The video clip can be overlaid on existing image content similarly to a single image frame. Some implementations may have stored a path and image frames included in a trail or smear of image frames that was created by moving the display view in the time period between the first and second user inputs as described above. Such image frames can be added to the image montage in block 314, e.g., added to an image providing the montage and/or stored in a data structure used to display the image montage (if these image frames were not added earlier).

In some implementations, specified areas can be defined in the panoramic image montage, and added image content cannot be displayed outside these defined areas or slots. For example, a grid or other arrangement of such defined areas can be provided. In such an implementation, the added image content can be added to an existing defined area, e.g., where the added image content is modified to be the same size and orientation of an existing image portion in the image montage which the added image content overlays.

In some implementations, portions of the added image content can be blurred, e.g., at the added content edges, to visually blend with the existing image content (and/or background) surrounding the added image content in the image montage. In some examples, portions of the existing image content, e.g., portions adjacent to the added image content edges, can also be blurred into edge portions of the added image content. For example, if an image frame is to be added, pixel values can be blurred within the image frame that are a predetermined pixel distance from the edges of the image frame. Further, in some examples, pixel values can be blurred surrounding the image frame in the image content of the panoramic image montage that are within a predetermined pixel distance from the edges of the added image frame. In some implementations, the image frame (or video clip) can be cropped to a smaller size, e.g., where the crop is centered on the center of the image frame, or centered on a detected image feature within the image frame (e.g., a face, animal, or other object). In some implementations, one or more other image filters or effects can be applied to the image frame (or to multiple image frames in a video clip) to be added, to adjust one or more pixel values of one or more pixels of the image frame(s). For example, brightness, contrast, blurring, sharpening, saturation, style (e.g., black and white, particular colors, sepia tones, etc.), noise reduction, feathering, diffusion filters (e.g., to randomly rearrange pixels in a specified radius), and/or other filters or effects can be applied to adjust pixel values (e.g., color values, brightness values, etc.) of pixels of the image frame that is to be added (or which has been added) to the image montage. One or more of these filters can be applied based on user input or stored user preferences, for example.

In some implementations, the interaction of the user with the panoramic image montage as in the displaying and updating process described herein can provide an impression to the user of "spraying" image content onto the virtual surface of the image montage, e.g., similar to spraying paint or other material on a surface. For example, updating the image montage may feel like spraying the image feed over background or existing image content of the panoramic image montage. In some examples, a weak spray may correspond to a short time period between first and second user inputs, and produce greater transparency and/or smaller size of the update portion. A strong spray may correspond to a longer time period and produce a more opaque and/or larger-sized overlay on existing image content of the panoramic montage with image frame(s) of the image feed. Further, in implementations providing a update that is a trail of feed image frames as described above, changing the device/camera orientation during the time period can achieve an effect of spraying over portions of the image montage that correspond to the orientations through which the camera is moved.

In some implementations, the system can check one or more conditions and/or prompt the user to determine whether the processing and update of blocks 312 and 314 should be performed. In some examples, one or more permission settings can be checked, where a permission setting can be associated with one or more image portions of the panoramic image montage, e.g., one or more component image portions or display areas of the montage. A permission setting indicates whether an associated image portion of the panoramic image montage is permitted to be replaced or overlaid by image content newly added to the image montage. If there is no such permission, the image portion is protected from being overlaid by new image content. For example, the user can designate permission settings with stored user preferences. Such settings can allow the user to designate particular image content in the montage to be "locked" so that it cannot be replaced or covered unless first unlocked. In some examples, some image portions of the image montage can be locked while other image portions can be unlocked and eligible to be replaced with image content in an update.

Some implementations can display a prompt on the display of the device that permits a user to specify whether to retain the update of block 314. In some implementations, the user can view different portions of the image montage and decide whether to keep or discard the update. If the update is to be discarded, updates from blocks 302-310 can be reversed or ignored.

In some additional example implementations, the system can check for one or more characteristics of the added image content and/or can compare the characteristics of added image content to characteristics of existing image content of the image montage. For example, a comparison of the added image content to existing image content of the montage may indicate that the added image content is the same or similar to an existing image portion of the montage. For example, the added and existing image content can be detected to depict the same image features, e.g., the same person (e.g., by checking for similar facial landmarks such as space between eyes, mouth, nose, etc., face shape, etc., without determining the person's identity), depicts a same or similar type of image content (e.g., same type of animal, buildings, vehicles, etc., same type of landscape features such as clouds, sky, a particular color of foliage, etc.), depicts the same emotions (e.g., laughter as detected by open-mouth smiles on faces, neutral expressions as detected by facial features, etc.), and other types of features. Other similarities of characteristics can also be checked, e.g., within a threshold range of capture time and/or capture geographic location of the image content, within a threshold range of time of each other as to when the image content was added to the image montage, etc.

In some implementations, the system can output a notification on the device about the similar content. For example, an arrow or line pathway (as described above) can be displayed in the display view indicate the orientation of the montage at which the similar image content is located and/or guide the view to that similar image content. In some implementations, the system can output from the device a prompt asking the user whether he or she wants to update the image montage with the added image content after displaying detected similar image content of the panoramic image montage. Some implementations can output (e.g., display) a recommendation indicating whether to retain the update of the image montage with the added image content or whether to discard the added image content, based on similar image content, based on user preferences and/or a history of previous user updates to the image montage, etc. For example, a recommendation can be based on whether the added image content is similar and based on user preferences. In one example, if user preferences and/or history of previous updates performed by the user indicate that the user prefers diversity in the image content displayed in the image montage, then the recommendation can recommend to discard the added image content if it is similar to existing image content (e.g., if the similarity has a score higher than a similarity threshold score based on having the same image features, same capture location, same pixel color and other characteristics, etc.).

In block 316, the update provided to the panoramic image montage in block 314 can be shared to one or more other devices and/or users. For example, the updated image montage data (or just the updates) can be sent to network addresses of one or more other users, and/or links or notifications can be sent to other users that allow network access and display of the updated image montage on connected devices of the other users. Some implementations can allow a user to designate the panoramic image montage to be a shared image montage that is viewed by other users.

In some implementations, a panoramic image montage can be updated by multiple users that have access to the image montage, e.g. substantially simultaneously, or at different times. For example, the image montage can be stored by an accessible storage or device, e.g., a server or accessible client device, and various users who can access the image montage can update the image montage using one or more features described herein. In some of these implementations, image portions of the image montage may receive updates from multiple users, where a latest update overlays any previous updates in the same location or area of the image montage. For example, image feeds on multiple devices can provide image frames to update the shared panoramic image montage. In some implementations, particular users, or particular types of image content (e.g., depicting particular subjects) may have a higher priority than other users or types of content, and content with higher priority can be displayed overlaid on lower priority image content. Some implementations can allow the user and/or other users to add user data to a panoramic image montage, including comments (e.g., in form of text, audio, etc.), ratings, notes, icons, emoji, links, text, stickers, voice notes, or other content to be stored as associated attachments to the image montage or as attachments to particular image portions of the image montage. For example, user data associated with a particular image portion of the image montage can be displayed if the associated image portion is displayed in the display view.

Various implementations can allow other types of updates to a panoramic image montage. For example, 3D objects can be added to an image montage, which can be viewed as described above. Audio data can be associated with particular image portions of the image montage (e.g., the audio can be played when those image potions are displayed in the display view) or with the image montage as an entire unit. Geographic locations can be associated with an image montage such that users physically entering the geographic location (or a threshold distance around the geographic location) are able to access, view, and/or update the panoramic image montage.

The blocks and operations described in the methods disclosed herein can be performed in a different order than shown or described, and/or performed simultaneously (partially or completely) with other blocks, where appropriate. Some blocks can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices 120, 122, 124, or 126 as shown in FIG. 1. In some implementations, one or more methods described herein can be implemented, for example, on a server system 102 as shown in FIG. 1, and/or on both a server system and a client system. In some implementations, different components of one or more servers and/or clients can perform different blocks, operations, or other parts of the methods.

Figure 4:
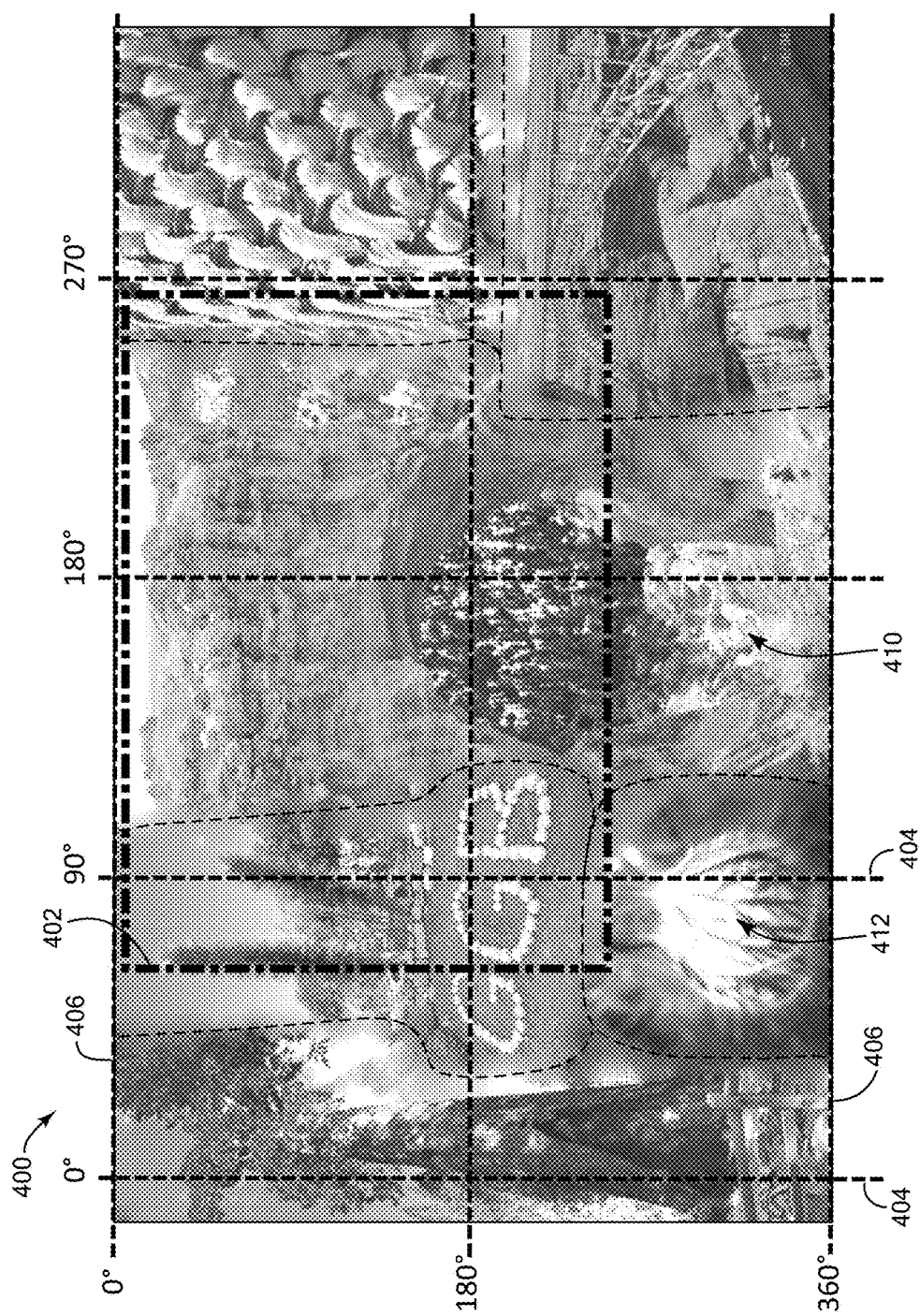
FIG. 4 is a diagrammatic illustration of an example panoramic image montage, according to some implementations.
Figure 5:
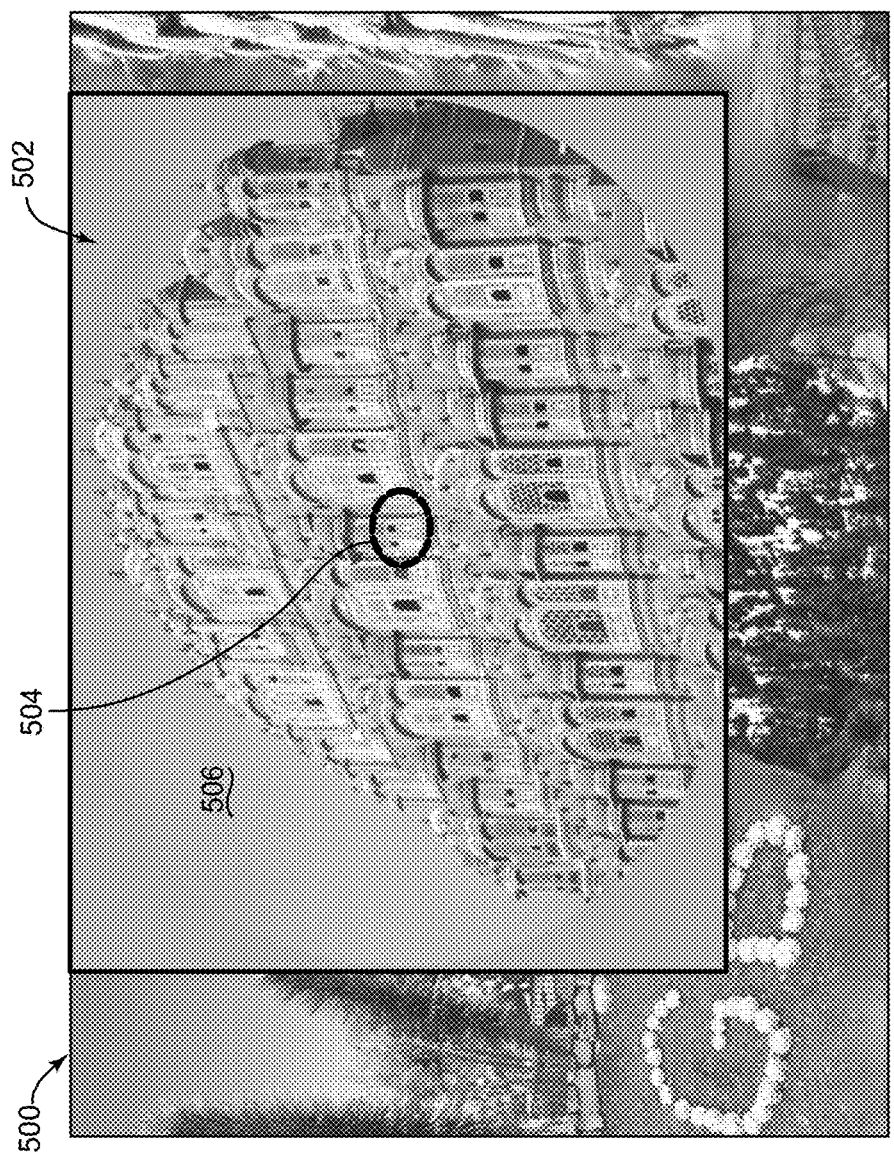
FIG. 5 is a diagrammatic illustration of an example display view of a panoramic image montage and image feed view, according to some implementations.
Figure 6:
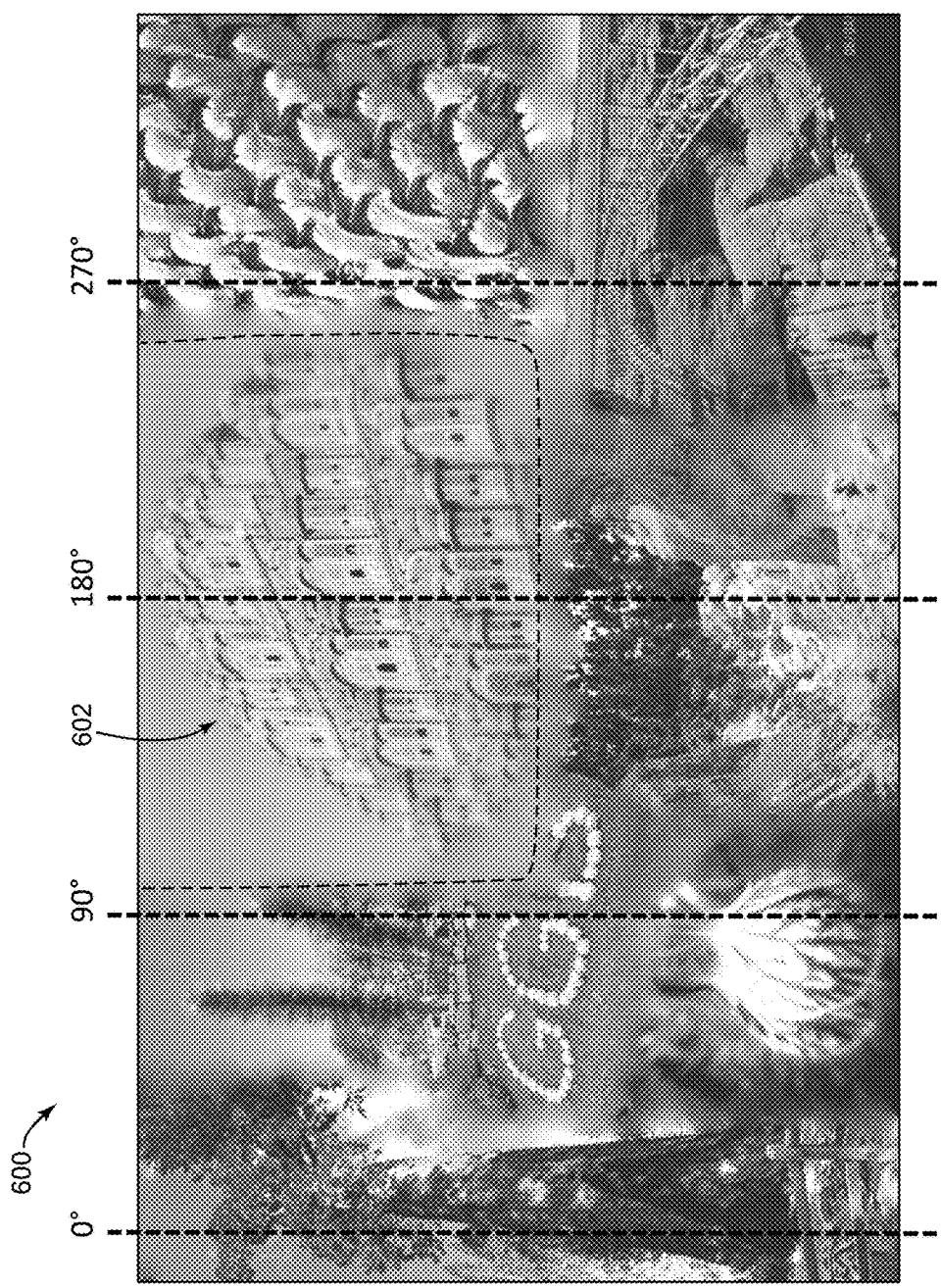
FIG. 6 is a diagrammatic illustration of an example panoramic image montage modified based on the image feed view of FIG. 5, according to some implementations.

FIGS. 4-6 are diagrammatic illustrations of example panoramic image montages and other features described herein. Similarly labeled items across FIGS. 4-6 indicate similar parts and may not be described for each figure.

FIG. 4 shows an example panoramic image montage 400 that can be displayed as a spherical panoramic image on a display screen. In the example of FIG. 4, panoramic image montage 400 is shown as a rectangle including its entire image content, e.g., showing the area that will cover a 360-degree spherical view when displayed as if projected on the inside surface of a sphere. For explanatory purposes, image montage 400 is not shown as an actual rectangular, two-dimensional form of a spherical image, e.g., an equirectangular projection image, which typically has a warped appearance for straight lines and other depicted features. Image montage 400 is shown as an approximation of how the image content may be displayed when viewing one portion of the image montage at a time, e.g., in a view on a display screen that is projecting the image spherically.

A portion of the panoramic image montage 400 can be displayed in a display view on a display of a device, e.g., a display screen. Display view 402, indicated by a dashed rectangle, can represent the extent of an example display view provided on a display screen, where the portion of the image montage 400 inside the display view 402 is displayed at one time. For example, the display view 402 can be displayed on a display screen of a mobile device, or on a display screen of other types of devices. In various implementations, the display view 402 can cover the entire display screen, or can cover a portion of the display screen, e.g., in a window or other screen portion. The size of the portion of the image montage 400 that can be displayed in the view 402 can vary depending on the size of the view, the size of the projected spherical surface (and thus simulated distance from the viewer), orientation of the viewing device, e.g., portrait or landscape, etc. For example, view 402 can be smaller in other implementations, or larger, and can be of different shapes (circular, oval, triangular, polygonal, star-shaped, etc.).

In this example, dashed lines 404 and dashed lines 406 indicate angular positions in horizontal and vertical view movement dimensions, respectively, when viewing different portions of the image montage by moving the display view 402. For example, a horizontal dimension reference angle of 0 degrees (indicated by a vertical dashed line 404) can indicate a reference angular position when horizontally scrolling (e.g., panning) the view 402 through the image montage. As the user pans the view over the image montage to the right, other angular positions appear in the view 402 of the display screen, including the 90 degree, 180 degree, and 270 degree positions, in that order. The image montage "wraps around" such that the display view 402 returns to the 0 degree position after panning to right of the right edge shown in FIG. 4. In some implementations, image montage 400 is a spherical image and is projected as if on a spherical surface, such that as the display view 402 is scrolled relative to the image montage 400, slight curvature or warping of the image content can be displayed within the view 402 as if the content were projected onto a spherical surface.

Similarly, a vertical dimension reference angle of 0 degrees (indicated by a horizontal dashed line 406) can indicate a reference angular position when vertically scrolling (e.g., tilting or vertical panning) the view 402 through the image montage. As the user tilts the view down over the image montage, other angular positions appear in the view 402 of the display screen, including the 180 degree and higher degree positions. The image montage "wraps around" such that the view 402 returns to the 0 degree position 406 after tilting down past the bottom edge shown in FIG. 4. In different implementations, the available angular positions may not be 360 degrees in either or both of the horizontal and vertical directions. For example, some panoramic image montages may include 360-degree content in a horizontal direction, with 180-degree content in the vertical direction. In another example, some panoramic image montages may be less than 360-degrees in the horizontal direction.

In some implementations, the display view 402 can be scrolled with respect to the image content of the panoramic image montage 400 based on an orientation associated with the display view 402. For example, the display view 402 can be displayed on a display screen of a mobile device, so that the orientation of the view is the orientation of the mobile device in space. In some examples, the user tilts the mobile device and the display screen to change the orientation of the view, which causes movement (e.g., scrolling) of the view to different portions of the image montage 400. In other implementations, the display view 402 can be scrolled with respect to the image montage 400 based on other input, e.g., user input indicating a particular orientation. For example, a user can provide touch input such as swiping over a touchscreen to change the orientation of the view, or can provide user input via a cursor and/or input device (e.g., mouse, joystick, etc.).

In some implementations, panoramic image montage 400 can be displayed on multiple screens, e.g., two screens of virtual reality goggles, with one screen positioned in front of each eye of a user, and providing stereoscopic adjustment to the image montage screens, e.g., to provide a three-dimensional view of the image content.

The panoramic image montage 400 can include areas that have been updated with different image portions or video clips. Some image portions in example montage 400 are shown with approximate dashed lines indicating their approximate area. For example, montage 400 includes a first image portion 410 and another area of the montage includes a second image portion 412, which were provided as captured image frames. The first image portion 410 has been overlapped by other image content and has an irregularly-shaped border, as indicated by dashed lines. The second image portion 412 was added to the montage 400 at a later time, and its edges were visually blended into the existing image portions of the montage, e.g., with blur effects. In this example, the entire viewable display area of the image montage 400 includes image content, such that there are no empty or blank areas of the montage 400.

FIG. 5 shows an example display view 500 of the panoramic image montage 400 shown in FIG. 4. Display view 500 can be displayed on a display screen of a device, e.g., similarly to display view 402 of FIG. 4 as described above. In the example of FIG. 5, display view 500 is displaying a portion of image montage 400 based on an orientation of the display view 500. For example, the orientation can be based on a current orientation in space of the device on which the display view 500 is viewed, or the orientation of the view can be based on other user input as described above.

In FIG. 5, an image feed view 502 is displayed within the display view 500. Image feed view 502 presents multiple image frames from a live feed. The image feed view 502 is displayed in response to receiving user input, e.g., first user input as described above. In some examples, the first user input can be the user touching a touchscreen on which the display view 500 is displayed. For example, a user touch 504 is indicated by a dashed oval. In this example, the image feed view 502 is displayed centered on the location of user touch 504 on the screen. In other implementations, the image feed view 502 display can be centered at the center of the display view 500, or in a different location of the display view 500.

In various implementations, the image feed view 502 can be displayed having a particular size and shape. For example, the size and shape of the image feed view 502 can be selected by a user in a menu and/or designated in user preferences. In the example of FIG. 5, the image feed view 502 is displayed within an oval shape centered within a rectangular border.

In this example, the image feed view 502 displays image frames that are captured in a live feed over time from the view of an associated camera. A particular image frame 506 is displayed at the current time. For example, a camera on a mobile device can be associated with the display of image feed view 502 such that the command to display the image feed view 502 causes the camera to capture and send image frames in the image feed view 502 within the display view 500. In some examples, the associated camera is located on the back of the mobile device and captures images based on the current orientation of the display view 500 and the mobile device. For example, image frame 506 can be a capture by the camera of a scene from the current surroundings of the mobile device. In another example, the associated camera can be on the front of the mobile device. The user may be able to switch the source of the image feed view 502 between multiple available cameras. Some implementations can associate a remote camera or other camera to provide the live feed in image feed view 502. Some implementations can provide a recorded image feed, e.g., image frames from a stored video or set of images.

FIG. 6 shows an example panoramic image montage 600 which is the panoramic image montage 400 of FIG. 4 changed by adding the image frame 506 shown in the image feed view 502 of FIG. 5. For example, image montage 600 can be displayed as a spherical panoramic image on a display screen, similarly to image montage 400.

Panoramic image montage 600 includes an image frame portion 602 based on the image frame 506 shown in the image feed view 502 of FIG. 5. Image frame portion 602 has been overlaid on (e.g., inserted into) the image montage 400 at the time a command (e.g., second user input) was received instructing to add the image frame 506 displayed in image feed view 502. In some examples, the second user input can be the release of the user touch 504 detected as the first user input as shown in FIG. 5. Upon the release of the user touch, the image frame portion 602 can be overlaid over the existing image content at a location or area of the image montage 400 that was covered at the time of that release by the image feed view 502 of FIG. 5, to form image montage 600. In this example, the view orientation and the camera orientation of the device did not change between the time of the first user input was received and the time the second user input was received. In some implementations, the edges of the image portion 602 can be blended into the image content that surrounds the image frame portion 602 in the image montage 600. In some implementations, to update the image montage 400 to image montage 600, the image frame portion 602 can be stitched into a single image providing the image content of the image montage 400. In other implementations, the image frame portion 602 can be saved as a separate image and displayed over the other image content to present the image montage 600.

Figure 7:
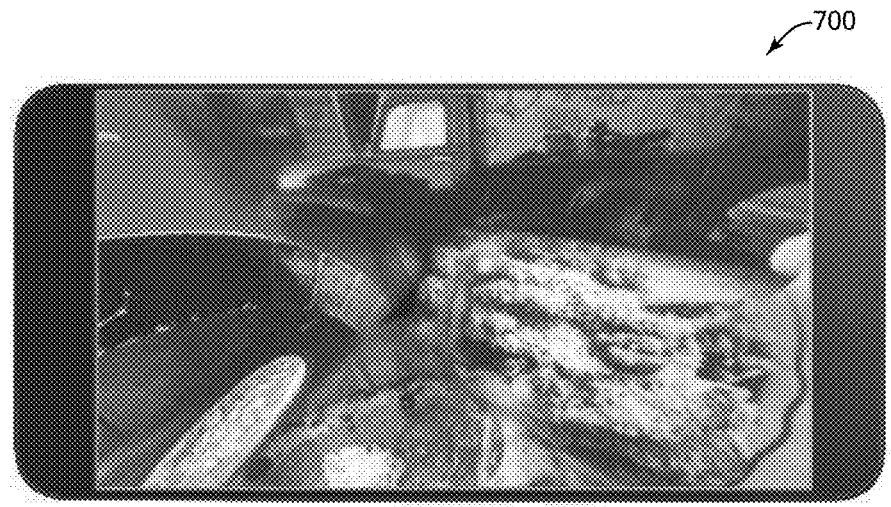
FIGS. 7 and 8 are diagrammatic illustrations of additional examples of displayed portions of a panoramic image montage, according to some implementations.
Figure 8:
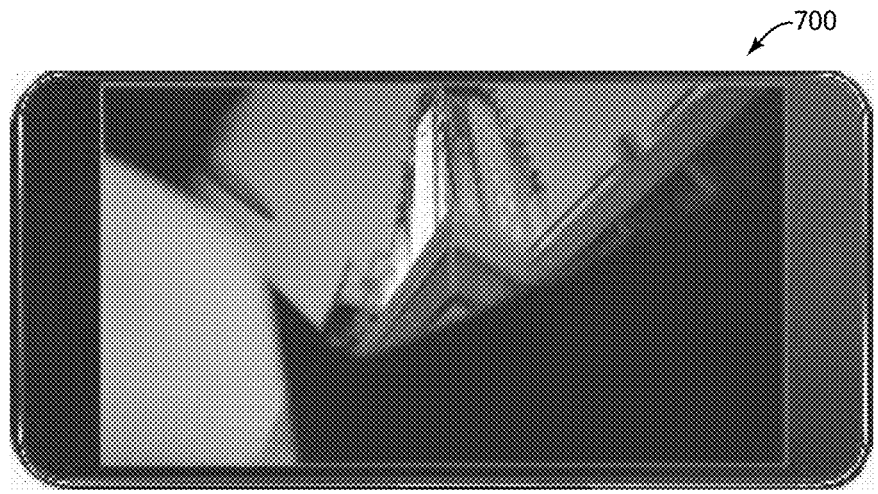

FIGS. 7 and 8 are diagrammatic illustrations of additional examples of displayed portions of a panoramic image montage according to one or more features described herein. FIG. 7 shows an example mobile device 700, e.g., a smartphone, tablet, or similar device. A view portion of a spherical image montage is displayed in a display view of the display screen of the device 700 when the device and view are oriented in a first orientation. Various image portions captured at different orientations and geographic locations have been added to the panoramic image montage and are blended together at their borders in the displayed image montage.

In FIG. 8, device 700 and display view have been moved to a different, second orientation, e.g., pointing further up from the ground than the orientation shown in FIG. 7. A different view portion of the spherical image montage is displayed in the display view of the device 700, where the different view portion corresponds to the second orientation. The view portion shown in FIG. 8 includes image portions that were captured from a camera oriented at a orientation corresponding to the second orientation. Also in FIG. 8, some areas of the displayed portion of the spherical image montage are shown to be showing a monotone background or default color, e.g., a dark color. These background areas have not been updated with image content, or may have had image content removed.

Figure 9:
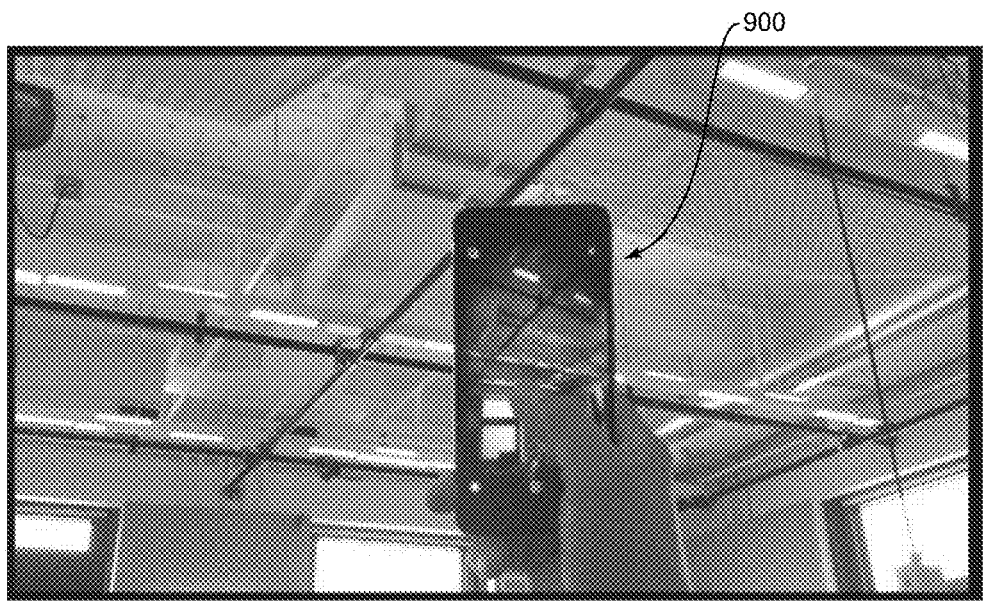
FIGS. 9 and 10 are diagrammatic illustrations of additional examples of updating a panoramic image montage by capturing image content, according to some implementations.
Figure 10:
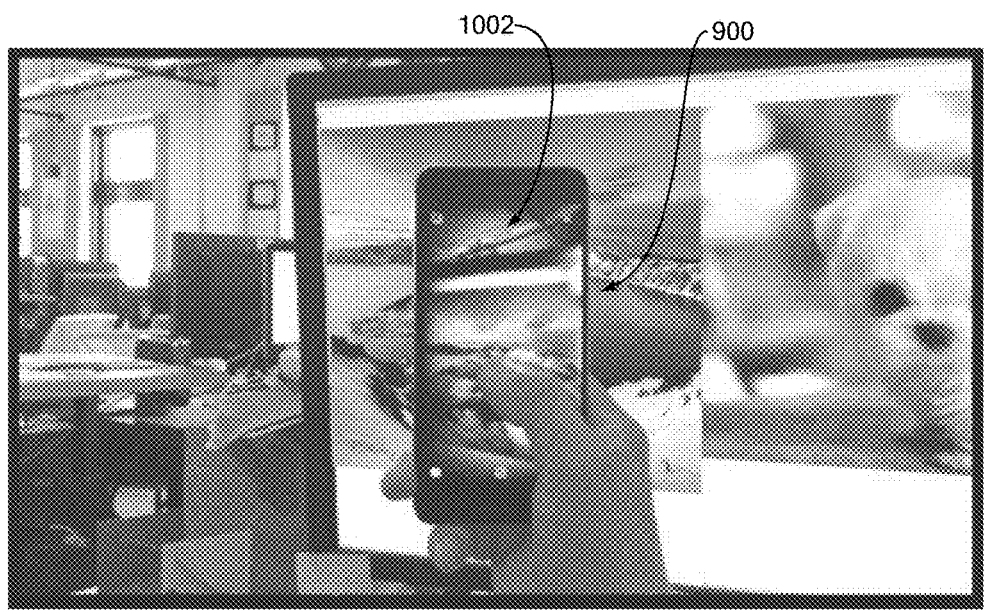

FIGS. 9 and 10 are diagrammatic illustrations of additional examples of updating a panoramic image montage by capturing image content. In FIG. 9, a user is holding a mobile device 900 that is displaying a view portion of a panoramic image montage on its touchscreen. The view and device are held at a first orientation, e.g., pointing toward a ceiling in a room. A camera on the rear of the device is also pointing in this first orientation. The user has pressed a finger to a location on the touchscreen (e.g., first user input) to cause a live feed from the rear camera to be displayed in the view. For example, any location in the display view on the touchscreen can provide the first user input in some implementations. In this example, the image feed view covers the entire view portion of the panoramic image montage in the display view. For example, some implementations can increase the size of the image feed view gradually from a smaller size to the shown size the longer the user holds the finger to the screen. In this example, if the user removes the finger from the screen (e.g., second user input), the displayed image frame is added to the panoramic image montage at a portion that corresponds to the orientation of the device.

In FIG. 10, the user has moved the device 900 to a different, second orientation. In one example, the user has rotated approximately in place within the same room shown in FIG. 9 to point the device to a different scene in the room, and has oriented the device 900 to a lower orientation than shown in FIG. 9. The user has pressed a finger to a location on the touchscreen (e.g., first user input) to cause a live feed from the rear camera to be displayed in the view. In this example, a portion 1002 of the panoramic image montage that is being displayed behind the live feed is shown above the image feed view. If the user removes the finger from the screen (e.g., second user input in this example), an image frame displayed in the image feed view is added to the panoramic image montage at the portion of the montage that corresponds to the orientation of the device.

Figure 11:
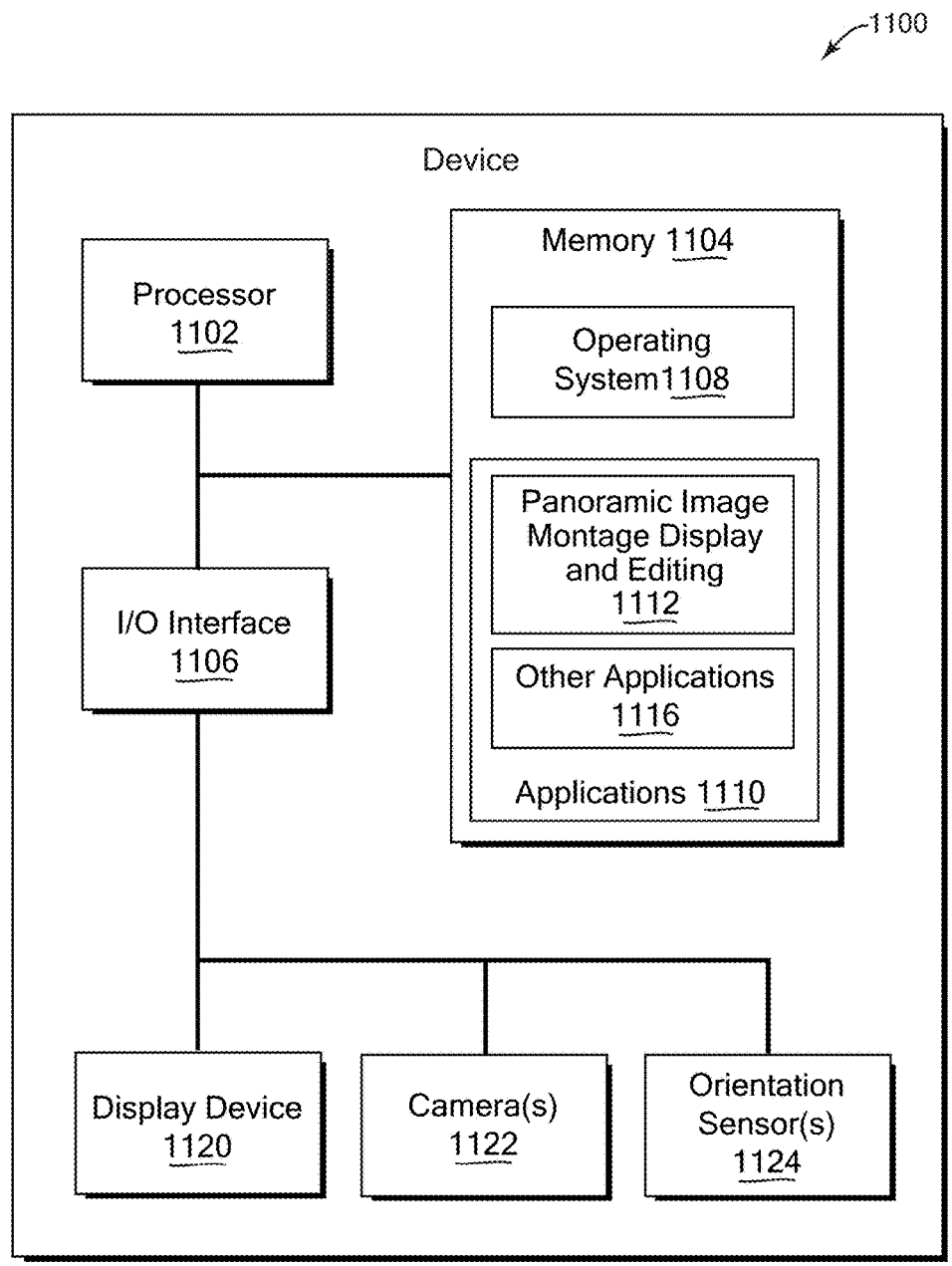
FIG. 11 is a block diagram of an example device which may be used for one or more implementations described herein.

FIG. 11 is a block diagram of an example device 1100 which may be used to implement one or more features described herein. In one example, device 1100 may be used to implement a client device, e.g., any of client devices 120-126 shown in FIG. 1. Alternatively, device 1100 can implement a server device, e.g., server device 104 of FIG. 1. Device 1100 can be any suitable computer system, server, or other electronic or hardware device as described above.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, virtual reality goggles or glasses, augmented reality goggles or glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

In some implementations, device 1100 includes a processor 1102, a memory 1104, and input/output (I/O) interface 1106. Processor 1102 can be one or more processors and/or processing circuits to execute program code and control basic operations of the device 1100. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1104 is typically provided in device 1100 for access by the processor 1102, and may be any suitable processor-readable storage medium, such as random access memory (RAM), read-only memory (ROM), Electrical Erasable Read-only Memory (EEPROM), Flash memory, etc., suitable for storing instructions for execution by the processor, and located separate from processor 1102 and/or integrated therewith. Memory 1104 can store software operating on the server device 1100 by the processor 1102, including an operating system 1108 and one or more applications 1110 such as a data display engine, web hosting engine, image display engine, notification engine, social networking engine, etc. In some implementations, the applications 1110 can include instructions that enable processor 1102 to perform functions described herein, e.g., some or all of the methods of FIGS. 2 and 3. For example, applications 1110 can include one or more panoramic image montage display and editing applications 1112, including a program to receive, display, and enable updating of panoramic image montages, and store related data as described herein. One or more of the applications can, for example, provide a displayed user interface responsive to user input to display selectable options or controls, and data based on selected options. Other applications or engines 1116 can also or alternatively be included in applications 1110, e.g., image editing applications, media display applications, communication applications, web hosting engine or application, etc. One or more methods disclosed herein can operate in several environments and platforms, e.g., as a stand-alone computer program that can run on any type of computing device, as a web application having web pages, as a mobile application ("app") run on a mobile computing device, etc.

Any of software in memory 1104 can alternatively be stored on any other suitable storage location or computer-readable medium. In addition, memory 1104 (and/or other connected storage device(s)) can store panoramic image montages, component image portions and related data structures, parameters, audio data, user preferences, and/or other instructions and data used in the features described herein. Memory 1104 and any other type of storage (magnetic disk, optical disk, magnetic tape, or other tangible media) can be considered "storage" or "storage devices."

I/O interface 1106 can provide functions to enable interfacing the server device 1100 with other systems and devices. Interfaced devices can be included as part of the device 1100 or can be separate and communicate with the device 1100. For example, network communication devices, storage devices (e.g., memory and/or database 106), and input/output devices can communicate via interface 1106. In some implementations, the I/O interface can connect to interface devices such as input devices (keyboard, pointing device, touchscreen, microphone, camera, scanner, sensors, etc.) and/or output devices (display device, speaker devices, printer, motor, etc.).

Some examples of interfaced devices that can connect to I/O interface 1106 can include a display device 1120 that can be used to display content, e.g., images, video, and/or a user interface of an output application as described herein. Display device 1120 can be connected to device 1100 via local connections (e.g., display bus) and/or via networked connections and can be any suitable display device. The display device 1120 can include any suitable display device such as an LCD, LED, or plasma display screen, CRT, television, monitor, touchscreen, 3-D display screen, or other visual display device. For example display device 1120 can be a flat display screen provided on a mobile device, multiple display screens provided in a goggles device, or a monitor screen for a computer device.

The I/O interface 1106 can interface to other input and output devices. Some examples include one or more cameras 1122, which can capture image frames based on detected scenes for updating panoramic image montages. Orientation sensors 1124, e.g., gyroscopes and/or accelerometers, can provide sensor data indicating device orientation (which can correspond to view orientation in some implementations) and/or camera orientation. Some implementations can provide a microphone for capturing sound (e.g., voice commands, etc.), audio speaker devices for outputting sound, or other input and output devices.

For ease of illustration, FIG. 11 shows one block for each of processor 1102, memory 1104, I/O interface 1106, and software blocks 1108 and 1110. These blocks may represent one or more processors or processing circuitries, operating systems, memories, I/O interfaces, applications, and/or software modules. In other implementations, server device 1100 may not have all of the components shown and/or may have other elements including other types of elements instead of, or in addition to, those shown herein. While server system 102 is described as performing blocks and operations as described in some implementations herein, any suitable component or combination of components of server system 102 or similar system, or any suitable processor or processors associated with such a system, may perform the blocks and operations described.

Methods described herein can be implemented by computer program instructions or code, which can be executed on a computer. For example, the code can be implemented by one or more digital processors (e.g., microprocessors or other processing circuitry) and can be stored on a computer program product including a non-transitory computer readable medium (e.g., storage medium), such as a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

One or more systems and methods discussed herein do not require collection or usage of user personal information. In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information specifically upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed such as procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:
  causing one or more view portions of a panoramic image montage to be displayed in a display view of a display device;
  receiving first user input at a first time while at least one of the one or more view portions of the panoramic image montage is displayed;
  in response to the first user input, causing an image feed to be displayed, wherein the image feed includes a plurality of image frames captured by a camera;
  receiving second user input at a second time later than the first time, wherein the second user input is received while a particular view portion of the one or more view portions of the panoramic image montage is displayed in the display view;
  determining a time difference between the first time and the second time; and
  in response to the second user input, updating the particular view portion of the panoramic image montage based on the image feed, wherein the updating is based on a particular image frame of the image feed, and
wherein the updating comprises:
modifying a display characteristic of the particular image frame based on the time difference to create a modified particular image frame; and
overlaying the modified particular image frame on an update portion of the panoramic image montage, wherein the update portion is at least partially displayed in the particular view portion of the panoramic image montage.

2. The computer-implemented method of claim 1, wherein the image feed is a live feed, wherein the particular image frame of the image feed is captured at the second time by the camera with a first orientation, and wherein a view orientation associated with the particular view portion of the panoramic image montage corresponds to the first orientation.

3. The computer-implemented method of claim 2, further comprising:
selecting one or more component image portions, each selected component image portion associated with a respective orientation; and
constructing the one or more view portions of the panoramic image montage from the one or more component image portions based on the respective orientation.

4. The computer-implemented method of claim 3, wherein the updating comprises storing the particular image frame as an additional component image portion, wherein the additional component image portion is associated with the view orientation, and further comprising:
storing the time difference between the first time and the second time as a parameter associated with the additional component image portion, wherein the parameter is used in modifying the display characteristic of the additional component image portion.

5. The computer-implemented method of claim 2, further comprising:
receiving, over a network from a second device, a second image frame associated with a second orientation; and
updating the update portion of the panoramic image montage based on the second image frame, wherein the update portion corresponds to the second orientation.

6. The computer-implemented method of claim 1, wherein the image feed is displayed in the display view over the particular view portion of the panoramic image montage.

7. The computer-implemented method of claim 1, wherein the particular image frame of the image feed corresponds to the second time.

8. The computer-implemented method of claim 1, wherein the display characteristic includes at least one of: a transparency level of the particular image frame, a size of the particular image frame, or visual appearance of pixels of the particular image frame as modified by an image filter.

9. The computer-implemented method of claim 8, wherein modifying the display characteristic of the particular image frame based on the time difference includes causing a plurality of command options to be displayed sequentially by the display device in an interval between the first time and the second time, and executing a particular command corresponding to a particular command option of the plurality of command options being displayed at the second time.

10. The computer-implemented method of claim 1, wherein
modifying the display characteristic includes determining a transparency level of the particular image frame based on the time difference.

11. The computer-implemented method of claim 1, wherein modifying the display characteristic comprises selecting a size of the particular image frame based on the time difference.

12. The computer-implemented method of claim 1, further comprising:
retrieving one or more component image portions, each component image portion associated with a respective orientation, wherein at least one of the one or more component image portions includes a plurality of component image frames; and
constructing the panoramic image montage from the one or more component image portions based on the respective orientation,
wherein causing the one or more view portions of the panoramic image montage to be displayed comprises rendering the plurality of component image frames of the at least one of the one or more component image portions in sequence.

13. The computer-implemented method of claim 1, wherein the updating comprises replacing the update portion of the panoramic image montage with a subset of the plurality of image frames, wherein each image frame in the subset is captured by the camera during a time interval between the first time and the second time.

14. The computer-implemented method of claim 1, wherein the display device is a touchscreen device, and wherein receiving the first user input comprises detecting, by the touchscreen device, a touch input by a user and receiving the second user input comprises detecting, by the touchscreen device, that the touch input has ceased.

15. The computer-implemented method of claim 1, wherein causing the one or more view portions of the panoramic image montage to be displayed in the display view includes causing a spherical display of the one or more view portions of the panoramic image montage.

16. The computer-implemented method of claim 1, wherein a shape of the update portion is one of: oval, rectangular, and rectangular with rounded corners.

17. The computer-implemented method of claim 1, wherein the particular view portion of the panoramic image montage includes image content data previously added to the panoramic image montage, the method further comprising:
determining, based on a permission setting, that replacement of the image content data in the panoramic image montage is permitted,
wherein the updating the particular view portion of the panoramic image montage is performed in response to the determining that replacement of the image content data in the panoramic image montage is permitted.

18. A device comprising:
a memory;
a camera;
a display;
an orientation sensor; and
at least one processor coupled to the orientation sensor, the display, and the camera, and configured to access the memory, the at least one processor configured to perform operations comprising:
causing one or more view portions of a panoramic image montage to be displayed in a display view of the display, wherein the one or more view portions are based on a device orientation of the device sensed by the orientation sensor;

receiving first user input at a first time while at least one of the one or more view portions of the panoramic image montage is displayed;

in response to the first user input, causing a live feed to be displayed in the display view, wherein the live feed includes a plurality of image frames captured by the camera with a camera orientation based on the device orientation;

receiving second user input at a second time later than the first time, wherein the second user input is received while a particular view portion of the one or more view portions of the panoramic image montage is displayed in the display view;

determining a time difference between the first time and the second time; and in response to the second user input, adding one or more image frames of the plurality of image frames from the live feed to at least one update portion of the panoramic image montage, wherein at least part of the at least one update portion is in the particular view portion of the panoramic image montage wherein adding the one or more image frames of the plurality of image frames comprises:

modifying a display characteristic of the one or more image frames of the plurality of image frames based on the time difference to create one or more modified image frames; and overlaying the one or more modified image frames on the at least one update portion of the panoramic image montage.

19. The device of claim 18, wherein the at least one processor is further configured to perform operations comprising:

causing a plurality of particular view portions to be displayed in the display view after receiving the first user input and before receiving the second user input, wherein the plurality of particular view portions are displayed based on changes in the device orientation; and adding multiple image frames from the live feed to a plurality of update portions of the panoramic image montage, wherein the plurality of update portions are in the plurality of particular view portions.

20. A non-transitory computer readable medium having stored thereon software instructions that, when executed by a processor, cause the processor to perform operations including:

receiving first user input at a device at a first time;

in response to the first user input, causing an image feed to be displayed by a display of the device, wherein the image feed includes a plurality of image frames;

receiving second user input at the device at a second time later than the first time, wherein the second user input is received while the device is oriented at a particular orientation;

determining a time difference between the first time and the second time; and in response to the second user input, adding one or more image frames of the plurality of image frames to a particular portion of a panoramic image area, wherein the particular portion corresponds to the particular orientation of the device, wherein adding the one or more image frames of the plurality of image frames includes:

modifying one or more display characteristics of the one or more image frames of the plurality of image frames based on the time difference to create one or more modified image frames; and overlaying the one or more modified image frames on the at least one update portion of the panoramic image montage, wherein after adding the one or more image frames, the one or more modified image frames are displayed in the display of the device in response to the device being oriented at the particular orientation.

* * * * *